US009319831B2

(12) United States Patent
Vulcano

(10) Patent No.: US 9,319,831 B2
(45) Date of Patent: Apr. 19, 2016

(54) MAPPING APPLICATION WITH AUTOMATIC STEPPING CAPABILITIES

(71) Applicant: Apple Inc., Cupertino, CA (US)

(72) Inventor: Emanuele Vulcano, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/632,002

(22) Filed: Sep. 30, 2012

(65) Prior Publication Data

US 2013/0324164 A1 Dec. 5, 2013

Related U.S. Application Data

(60) Provisional application No. 61/655,995, filed on Jun. 5, 2012, provisional application No. 61/655,997, filed on Jun. 5, 2012, provisional application No. 61/656,015, filed on Jun. 6, 2012, provisional (Continued)

(51) Int. Cl.
*H04W 4/02* (2009.01)
*G01C 21/34* (2006.01)
*G01C 21/36* (2006.01)

(52) U.S. Cl.
CPC .................. *H04W 4/02* (2013.01); *G01C 21/34* (2013.01); *G01C 21/3626* (2013.01)

(58) Field of Classification Search
CPC ........ H04W 4/02; H04W 64/00; G01C 21/34; G01C 21/3626
USPC ............... 455/456.1–457; 701/400–418, 425, 701/428, 431, 436, 437, 440
See application file for complete search history.

(56) References Cited

U.S. PATENT DOCUMENTS

| 5,459,667 | A | 10/1995 | Odagaki et al. |
| 5,654,892 | A | 8/1997 | Fujii et al. |
| 5,862,511 | A | 1/1999 | Croyle et al. |
| 5,878,368 | A | 3/1999 | DeGraaf |
| 6,029,111 | A | 2/2000 | Croyle |
| 6,163,269 | A | 12/2000 | Millington et al. |
| 6,178,380 | B1 | 1/2001 | Millington |
| 6,295,503 | B1 | 9/2001 | Inoue et al. |
| 6,360,167 | B1 | 3/2002 | Millington et al. |

(Continued)

FOREIGN PATENT DOCUMENTS

| WO | WO 2007/056450 | 5/2007 |
| WO | WO 2011/025555 | 3/2011 |

(Continued)

OTHER PUBLICATIONS

Author Unknown, "'Touch & Go' Owner's Manual," Jul. 2011, 218 pages, Toyota, United Kingdom.

(Continued)

*Primary Examiner* — Marcos Torres
(74) *Attorney, Agent, or Firm* — Adeli LLP

(57) ABSTRACT

For a mobile device having a display area, a method of displaying instructional signs of a route in the display area is described. The method receives selection of a route having several junctures. The route includes several displayable signs for showing a set of maneuver instructions for at least some of junctures of the route. The method tracks the current location of the device as the device is moving. The method displays different signs by sliding the signs in and out of the display area based on the current location of the device.

18 Claims, 27 Drawing Sheets

Related U.S. Application Data application No. 61/656,080, filed on Jun. 6, 2012, provisional application No. 61/699,795, filed on Sep. 11, 2012, provisional application No. 61/699,842, filed on Sep. 11, 2012, provisional application No. 61/657,864, filed on Jun. 10, 2012, provisional application No. 61/699,841, filed on Sep. 11, 2012, provisional application No. 61/699,851, filed on Sep. 11, 2012, provisional application No. 61/699,862, filed on Sep. 11, 2012.

(56) References Cited

U.S. PATENT DOCUMENTS

| | | | |
|---|---|---|---|
| 6,480,783 | B1 | 11/2002 | Myr |
| 6,487,305 | B2 | 11/2002 | Kambe et al. |
| 6,615,130 | B2 | 9/2003 | Myr |
| 7,054,742 | B2 | 5/2006 | Khavakh et al. |
| 7,194,356 | B2 | 3/2007 | Sano |
| 7,433,780 | B2 | 10/2008 | Machino |
| 7,729,854 | B2 | 6/2010 | Muramatsu |
| 7,761,227 | B2 | 7/2010 | Kropp |
| 8,301,378 | B2 | 10/2012 | Nishibashi et al. |
| 8,306,730 | B2 | 11/2012 | Nishibashi et al. |
| 8,428,871 | B1 | 4/2013 | Matthews et al. |
| 2004/0048620 | A1 | 3/2004 | Nakahara et al. |
| 2004/0204840 | A1 | 10/2004 | Hashima et al. |
| 2005/0049786 | A1 | 3/2005 | Odachi et al. |
| 2005/0273251 | A1 | 12/2005 | Nix et al. |
| 2005/0273252 | A1 | 12/2005 | Nix et al. |
| 2006/0041372 | A1 | 2/2006 | Kubota et al. |
| 2006/0195257 | A1 | 8/2006 | Nakamura |
| 2008/0208450 | A1 | 8/2008 | Katzer |
| 2008/0228393 | A1 | 9/2008 | Geelen et al. |
| 2008/0320419 | A1 | 12/2008 | Matas et al. |
| 2009/0063041 | A1 | 3/2009 | Hirose et al. |
| 2009/0063048 | A1* | 3/2009 | Tsuji .............................. 701/212 |
| 2009/0164115 | A1 | 6/2009 | Kosakowski et al. |
| 2009/0182497 | A1 | 7/2009 | Hagiwara |
| 2009/0216434 | A1 | 8/2009 | Panganiban et al. |
| 2010/0057358 | A1 | 3/2010 | Winer et al. |
| 2010/0153010 | A1 | 6/2010 | Huang |
| 2010/0309149 | A1 | 12/2010 | Blumenberg et al. |
| 2010/0324816 | A1 | 12/2010 | Highstrom et al. |
| 2011/0098918 | A1 | 4/2011 | Siliski et al. |
| 2011/0167058 | A1 | 7/2011 | van Os |
| 2011/0208421 | A1 | 8/2011 | Sakashita |
| 2012/0041674 | A1 | 2/2012 | Katzer |
| 2012/0143504 | A1 | 6/2012 | Kalai et al. |
| 2012/0158290 | A1 | 6/2012 | Bharathan et al. |
| 2012/0259539 | A1 | 10/2012 | Sumizawa |
| 2012/0259541 | A1* | 10/2012 | Downey et al. ................ 701/433 |
| 2012/0303263 | A1 | 11/2012 | Alam et al. |
| 2012/0303268 | A1 | 11/2012 | Su et al. |
| 2013/0035853 | A1 | 2/2013 | Stout et al. |
| 2013/0191020 | A1 | 7/2013 | Emani et al. |
| 2013/0222378 | A1* | 8/2013 | Koivusalo ...................... 345/419 |

FOREIGN PATENT DOCUMENTS

| | | |
|---|---|---|
| WO | WO 2011/076989 | 6/2011 |
| WO | WO 2011/084156 | 7/2011 |

OTHER PUBLICATIONS

Author Unknown, "Android 2.3.4 User's Guide", May 20, 2011, pp. 1-384, Google, Inc.

Author Unknown, "Garmin. nüví 1100/1200/1300/1400 series owner's manual," Jan. 2011, 72 pages, Garmin Corporation, No. 68, Jangshu 2$^{nd}$ Road, Sijhih, Taipei County, Taiwan.

Ruhs, Chris, "My Favorite Android Apps: Maps," Jun. 24, 2011, 1 page, available at http://www.youtube.com/watch?v=v2aRkLkLT3s.

Author Unknown, "Blaupunkt chooses NNG navigation software for new aftermarket product," May 24, 2011, 2 pages, available at http://telematicsnews.info/2011/05/24/blaupunkt-chooses-nng-navigation-software-for-new-aftermarket-product_my2241/.

Lawrence, Steve, "Review: Sygic Mobile Maps 2009," Jul. 23, 2009, 4 pages, available at http://www.iphonewzealand.co.nz/2009/all/review-sygic-mobile-maps-2009/.

Author Unknown, "Mazda: Navigation System—Owner's Manual", available at http://download.tomtom.com/open/manuals/mazda/nva-sd8110/Full_Manual_EN.pdf, Jan. 1, 2009, 159 pages.

Dube, Ryan, "Use Google Maps Navigation for Turn-By-Turn GPS [Android]", available at http://www.makeuseof.com/tag/google-maps-navigation-turnbyturn-gps-android/, Jun. 24, 2010, 7 pages.

* cited by examiner

MAPPING APPLICATION WITH AUTOMATIC STEPPING CAPABILITIES

CLAIM OF BENEFIT TO PRIOR APPLICATIONS

This application claims benefit to U.S. Provisional Patent Application 61/655,995, filed Jun. 5, 2012; U.S. Provisional Patent Application 61/655,997, filed Jun. 5, 2012; U.S. Provisional Patent Application 61/656,015, filed Jun. 6, 2012; U.S. Provisional Patent Application 61/656,080, filed Jun. 6, 2012; U.S. Provisional Patent Application 61/657,864, filed Jun. 10, 2012; U.S. Provisional Patent Application 61/699,795, filed Sep. 11, 2012; U.S. Provisional Patent Application 61/699,842, filed Sep. 11, 2012; U.S. Provisional Patent Application 61/699,841, filed Sep. 11, 2012; U.S. Provisional Patent Application 61/699,851, filed Sep. 11, 2012; and U.S. Provisional Patent Application 61/699,862, filed Sep. 11, 2012. U.S. Provisional Patent Applications 61/655,995, 61/655,997, 61/656,015, 61/656,080, 61/699,795, 61/699,842, and 61/699,861 are incorporated herein by reference.

BACKGROUND

With proliferation of mobile devices such as smartphones, users are enjoying numerous applications of numerous kinds that can be run on their devices. One popular type of such application is a navigation application that computes a route between a current location of a user and a destination location provided by the user. A navigation application guides the user along the computed route to the destination. Some navigation applications also allow the user to inspect the computed route. However, these navigation applications have restrictions that may inconvenience the user in navigating or inspecting the route. For instance, some navigation applications require that the user be on a route at all times.

BRIEF SUMMARY

Some embodiments of the invention provide a mapping application that has several operational modes including a navigation mode, a map browsing mode, a route inspection mode, and an automatic stepping mode. In the automatic stepping mode, the mapping application of some embodiments displays in a display area a maneuver instruction for a juncture in a computed route based on the current location of the device on which the mapping application runs. As the device moves along the route, the mapping application operating in the automatic stepping mode tracks the position of the device and displays another maneuver instruction of another juncture when the device comes within a certain threshold distance from the other juncture. In this manner, the mapping application allows the user of the mapping application (and the device) to view the user's progress within the route in an automatic fashion.

The mapping application operating in the automatic stepping mode displays a current juncture indicator on a juncture that has a step (i.e., a maneuver instruction to display) and that is currently associated with the current position of the device. The mapping application also chooses a step to display in the display area based on the current location of the device and the direction of the movement of the device.

Different embodiments associate the current location and a juncture differently and choose a step to display in the display differently. In some embodiments, the mapping application identifies a midpoint between a first juncture and a second juncture that have two consecutive steps. When the device does not go past the identified midpoint, the mapping application associates the current location of the device with the first juncture. That is, the mapping application displays the current juncture indicator on the first juncture. The mapping application also displays the step for the first juncture in the display area. Once the device moves past the identified midpoint (i.e., when the device is closer to the second juncture), the mapping application associates the current location with the second juncture and moves the current juncture indicator from the first juncture to the second juncture. The mapping application also displays the step for the second juncture.

In some embodiments, the mapping application operating in the automatic stepping mode defines a range for each juncture that has a step. In some embodiments, the range of each juncture may vary depending on various factors and may be different from the range of other junctures along the route. When the device comes within the range of a first juncture, the mapping application displays the current juncture indicator on the first juncture. The mapping application does not move the current juncture indicator to a second juncture with a step until the device moves into the range of the second juncture. In some embodiments, the mapping application defines the same range for each juncture with a step in the route. However, the mapping application defines different ranges for a route that is calculated for a driving direction and for a route that is calculated for a walking direction. A route that is calculated for providing a driving direction has larger range than a range that a route that is calculated for providing a walking direction has.

In some embodiments, a route may require both driving directions and walking directions. The mapping application calculates ranges for each juncture based on the transport type used for that particular juncture. Although the mapping application assumes the user starts on the transport type they have chosen when they asked for the route (e.g., by car or by walking), some routes switch types at certain points where appropriate. For example, a route for driving directions might end at a particular location that is not yet the final destination (e.g., in the middle of a park), and switch to walking directions for the remaining portion of the route. In this situation, the mapping application adjusts the range of the remaining junctures to correspond to a user walking rather than driving.

In some such embodiments, the mapping application displays a step for a first juncture until the device moves out of the range of the first juncture. At that point, if the movement away from the first juncture is a movement towards a second juncture that has the next step in the route, the mapping application starts displaying the next step. When the device moves away from the second juncture before the device enters the range of the second juncture, the mapping application keeps the current juncture indicator at the first juncture and keeps displaying the step for the second juncture. When the device enters into a range of a juncture that is different from the first juncture, the mapping application displays the step of this juncture and moves the current step indicator to this juncture from the first juncture.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
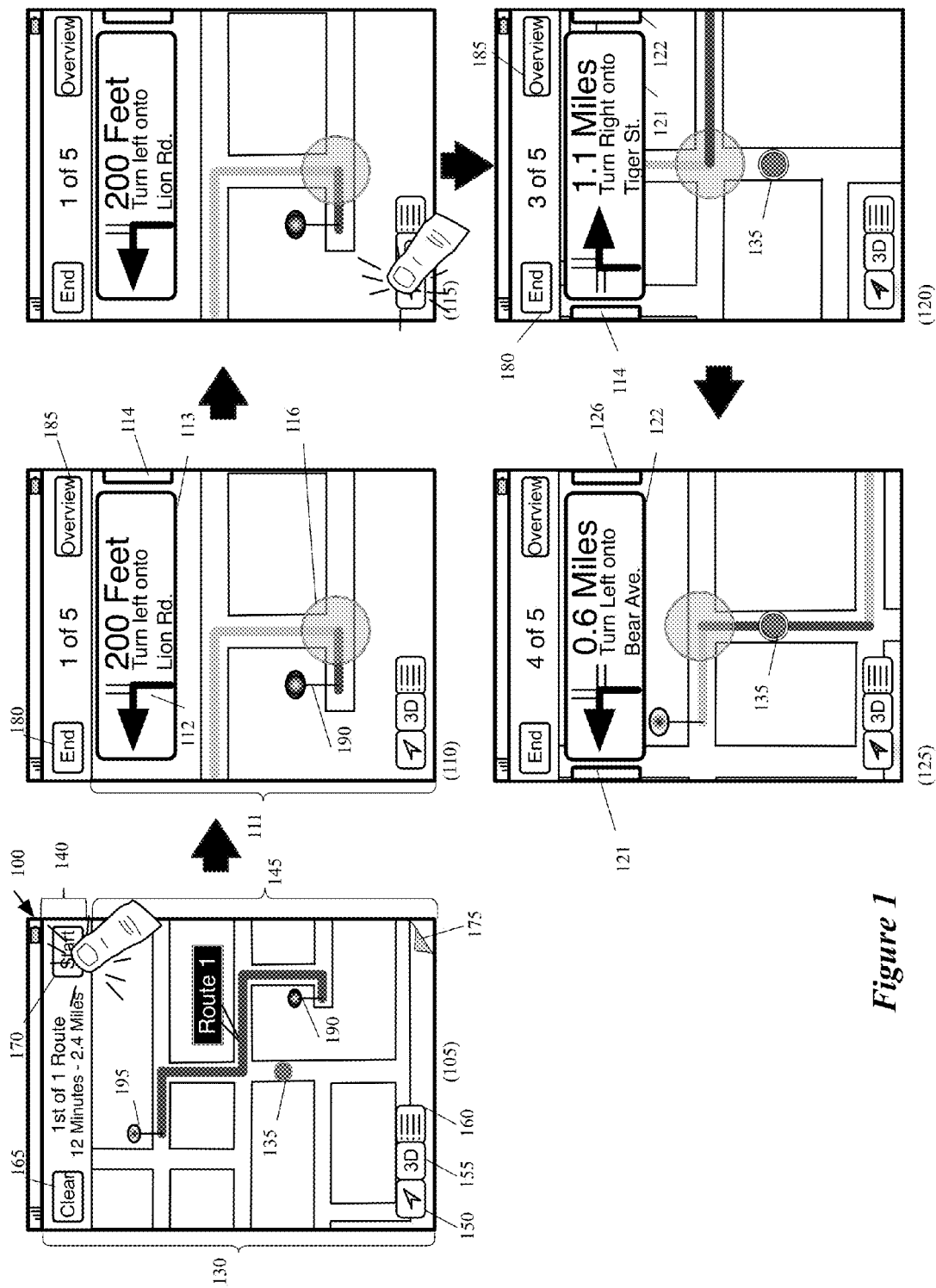
FIG. 1 illustrates an example of a device that executes a multi-mode mapping application of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a mapping application that has several operational modes including a navigation mode, a map browsing mode, a route inspection mode, and an automatic stepping mode. In the automatic stepping mode, the mapping application of some embodiments displays in a display area a maneuver instruction for a juncture in a computed route based on the current location of the device on which the mapping application runs. As the device moves along the route, the mapping application tracks the position of the device and displays another maneuver instruction of another juncture when the device comes within a certain threshold distance from the other juncture. In this manner, the mapping application allows the user of the mapping application (and the device) to view the user's progress within the route.

A juncture is where two or more road segments meet. A route is a path between a starting location and a destination location in the map. A typical route has zero or many junctures along the path between the two locations. A maneuver instruction for a juncture in the route identifies the direction of the road segment to advance from the juncture. In some embodiments, the mapping application provides the user with a maneuver instruction only for some of the junctures along the route because the user may not need to perform a maneuver at every juncture in the route in order to reach the destination location. For instance, the user carrying the device may recognize that the user only needs to go straight by passing through several junctures until the user reaches a juncture at which to make a turn to get to the destination location. In this application, when a juncture has a maneuver instruction to display, that maneuver instruction is referred to as a "step."

In the automatic stepping mode, the mapping application of some embodiments displays one step at a time in the display area. When the device moves within the threshold distance of another juncture that has the next step, the mapping application displays the next step by sliding the current step out of the display area and sliding the next step into the display area. When the user carrying the device does not follow the route and deviates from the route while the mapping application is operating in the automatic stepping mode, the mapping application of some embodiments does not re-calculate the route from the deviated location. Rather, the mapping application keeps displaying the currently displayed step until the device comes back within the threshold distance to a juncture associated with a step in the route. That is, the mapping application does not require the device to be "on" the route at all times. Also, the mapping application of some embodiments operating in the automatic stepping mode does not provide the steps audibly.

In the navigation mode, the mapping application of some embodiments provides the user with a set of steps for a route between the device's current location to a destination location. Typically, the mapping application provides the user with these steps visually and audibly in the navigation mode. When the user carrying the device deviates from the route, the mapping application of some embodiments re-calculates a new route from the deviated location in order to re-direct the user to the destination location from the deviated location. In other words, the mapping application of some embodiments operating in the navigation mode requires the device to be on a route at all times. Also, the mapping application of some embodiments operating in the navigation mode displays the steps by "popping up" the step rather than sliding the steps in and out of the display area. Furthermore, the information in the step (i.e., the maneuver instruction) that the mapping application displays while operating in the navigation mode is dynamic in some embodiments. That is, information such as estimated time of arrival, remaining time of the trip to the destination location, remaining distance from the current location of the device to the destination location or the next juncture with next step, etc. get updated by the mapping application as the device is moving along the route.

In the route inspection mode, the mapping application of some embodiments allows the user to slide the steps in and out of the display area to inspect each step in the route. Alternatively, the mapping application allows the user to manipulate the map (e.g., by zooming in and out, sliding the map in different directions) to display different junctures in the route. When a juncture with a step is displayed in the display area as a result of the user's manipulation of the map, the mapping application displays the step by sliding in the step (and sliding in and out any intermediate steps between the previously displayed step and the currently displayed step). In this manner, the user can inspect the route by manually sliding the steps in and out of the display area or by manipulating the map to display certain junctures of the route in the display area. The route inspection mode may be referred to as manual stepping mode or stepping mode.

The mapping application of some embodiments operates in the automatic stepping mode when (1) the route is computed for driving direction and neither the starting location and the destination of the route is the current location of the device or (2) when the route is computed for providing walking directions. While operating in the automatic stepping mode, the mapping application tracks the current location of the device to display an appropriate step based on the current location of the device. The mapping application of some embodiments identifies the location of the device using the coordinates in the GPS signal that the device receives at the location of the device. Alternatively or conjunctively, the mapping application uses other methods (e.g., cell tower triangulation) to compute the current location.

The mapping application operating in the automatic stepping mode displays a current juncture indicator on a juncture that has a step (i.e., a maneuver instruction to display) and that is currently associated with the current position of the device. The mapping application also chooses a step to display in the display area based on the current location of the device and the direction of the movement of the device.

Different embodiments associate the current location and a juncture differently and choose a step to display in the display differently. In some embodiments, the mapping application identifies a midpoint between a first juncture and a second juncture that have two consecutive steps. When the device does not go past the identified midpoint, the mapping application associates the current location of the device with the first juncture. That is, the mapping application displays the current juncture indicator on the first juncture. The mapping application also displays the step for the first juncture in the display area. Once the device moves past the identified midpoint (i.e., when the device is closer to the second juncture), the mapping application associates the current location with the second juncture and moves the current juncture indicator from the first juncture to the second juncture. The mapping application also displays the step for the second juncture.

In some embodiments, the mapping application operating in the automatic stepping mode defines a range for each juncture that has a step. When the device comes within the range of a first juncture, the mapping application displays the current juncture indicator on the first juncture. The mapping application does not move the current juncture indicator to a second juncture with a step until the device moves into the range of the second juncture. In some embodiments, the mapping application defines the same range for each juncture with a step in the route. However, the mapping application defines different ranges for a route that is calculated for a driving direction and for a route that is calculated for a walking direction. A route that is calculated for providing driving directions has a larger range (e.g., 200 meters) than a range calculated for providing walking directions (e.g., 50 meters).

In some such embodiments, the mapping application displays a step for a first juncture until the device moves out of the range of the first juncture. At that point, if the movement is away from the first juncture and is moving towards a second juncture that is the next step in the route, the mapping application starts displaying the next step. When the device moves away from the second juncture before the device enters the range of the second juncture, the mapping application keeps the current juncture indicator at the first juncture and keeps displaying the step for the second juncture. When the device enters into a range of a juncture that is different from the first juncture, the mapping application displays the step of this juncture and moves the current step indicator to this juncture from the first juncture.

Several more detailed embodiments of the invention are described in the sections below. Section I below describes the mapping application of some embodiments operating in the automatic stepping mode. Section II then describes the mapping application of some embodiments that can operate in several different modes. Section III follows with a description of an electronic system that employ the mapping application of some embodiments. Section IV lastly describes a map service operating environment used by some embodiments of the invention.

I. Auto Advancement of Steps

As mentioned above, the mapping application of some embodiments has several operational modes including the navigation mode, the viewing mode, the route inspection mode, and the automatic stepping mode. In the automatic stepping mode, the mapping application of some embodiments tracks the current position of the device on which the mapping application runs. The mapping application displays a step for a juncture of a route based on the device's proximity to the juncture. Also, the mapping application of some embodiments associates the current position of the device with a juncture and places the current step indicator on the juncture. With the displayed step and the current step indicator, the mapping application allows the user to see the user's progress in the route.

A. Switching into Automatic Stepping Mode

FIG. 1 illustrates an example of a device 100 that executes a multi-mode mapping application of some embodiments of the invention. Specifically, this figure illustrates in five different stages 105-125 the mapping application switching from the route inspection mode into the automatic stepping mode and operating in the automatic stepping mode.

The first stage 105 illustrates the mapping application's user interface (UI) 130. At this stage, the mapping application is operating in the viewing mode. The UI 130 displays a UI page 145 after one of several routes computed for a starting location and a destination location is selected. Route generation and selection are described in detail in the U.S. Provisional Application 61/657,858.

As shown in this stage, the UI page 145 that displays a region of a map that includes the selected route, "Route 1," and a current location indicator 135 indicating the device's current position in the map. At the ends of the route, the UI page 145 displays a starting location pin 190 and the ending location pin 195. The UI 130 also includes several UI controls arranged in a top bar 140, and as floating controls in the UI page 145. The floating controls include a position control 150, a 3D control 155, and a list control 160, while the top bar 140 includes a clear control 165 and a start control 170. The UI page 145 also includes a page curl control 175.

The position control 150 allows the current position of the device to be specifically noted on the map. Once this position control is selected once, the mapping application of some embodiments tracks the current position of the device by maintaining the current location indicator 135 at the center of the currently displayed region of the map. As the device is moving, the mapping application displays different regions of the map while maintaining the current location indicator 135 at the center of the region being displayed. In some embodiments, a second tap of the position control 150 causes the mapping application to rotate the map to match the direction the user is facing as the user moves along the map. The position control of some embodiments is further elaborated in concurrently filed U.S. patent application Ser. No. 13/632,102, entitled "Problem Reporting in Maps", now published as United States Patent Publication 2013/0326407. This concurrently filed U.S. Patent Application, now published as United States Patent Publication 2013/0326407, is incorporated herein by reference.

The 3D control 155 is a control for viewing, inspecting, or stepping a route in three dimensions (3D). The mapping application provides the 3D control as a quick mechanism of getting into and out of 3D. This control also serves as (1) an indicator that the current view is a 3D view, and (2) an indicator that a 3D perspective is available for a given map view (e.g., a map view that is zoomed out might not have a 3D view available).

The list control 160 is a control for brining up a model list view in some embodiments. When there are opportunities to display a list of items, be it a list of instructions in a route or a list of search results when multiple results are found for a given query, the mapping application of some embodiments displays the list control 160 as one of the floating controls. Tapping the list control brings up a modal list view in some embodiments. In some embodiments, the list view itself is adapted and optimized for the type of list being displayed, in that steps of the selected route will be displayed when a route has been selected.

The page curl control 175 is a selectable UI item that (1) indicates the location of another set of controls that are conceptually "behind" the current view, and (2) when selected, directs the application to present an animation that "peels" off the current view to display another view that shows the other set of controls. The use of the page curl control allows the application to display more of the map while offering an unobtrusive way to access further functionality that is provided by the other set of controls. Additionally, in some embodiments, the application does not use the page curl control where the additional functionality is deemed to be inappropriate to the task at hand. For instance, in some embodiments, the mapping application does not display this page curl control while operating in the navigation mode, in the route inspection mode, or in the automatic stepping mode.

The clear control 165 is for clearing the map. When the clear control 165 is selected, anything that is displayed on the map, including pins and routes, with the exception of the current location indicator 135, is cleared. In some embodiments, the list control 610 will also slide under the 3D control 155 when the clear control 165 is selected.

The start control 170 is for switching to the navigation mode, the route inspection mode, or the automatic stepping mode according to the selected route. Upon receiving a selection of the start control 170, the mapping application of some embodiments starts to operate in the navigation mode when the starting location of the route is the current location of the device. The mapping application starts to operate in the route inspection mode when neither of the starting location and the destination location is the current location of the device or when the route is calculated for providing the user with a walking direction.

At the first stage 105, the top bar 140 also displays a short description of the selected route. In some embodiments, the description of the route displayed in the top bar 140 includes the identifier of the selected route, a duration in time that the travel from the starting location to the destination location of the route in a particular transport type (e.g., walking, driving, etc.), and the total travel distance between the two locations.

The mapping application of some embodiments starts to operate in the automatic stepping mode also when neither of the starting location nor the destination location is the current location of the device or when the route is calculated for providing the user with walking directions. However, in order to switch to the automatic stepping mode, the position control 150 needs to be selected in order to have the mapping application track the current location of the device when the mapping application receives a selection of the start control 170. In this example, the first stage 105 shows the user's selection of the start control 170. Because the position control 150 is not selected, the mapping application starts to operate in the route inspection mode.

The second stage 110 shows that the UI 140 is displaying a UI page 111 that shows a sign 113. In some embodiments, a sign is a selectable UI item for displaying a step (i.e., a maneuver instruction) of the route. A sign also includes a direction indicator 112 for showing the direction to advance from the juncture associated with the displayed step. In this example, the sign 113 displays the first step of the route as shown. The second stage 110 also illustrates portion of a sign 114 which shows the next step of the route. The mapping application of some embodiments also places a current step indicator 116 at a juncture that corresponds to the first step. As shown, the mapping application has zoomed in on the map so as to display a region of the map that includes the starting location pin 190 in detail.

The top bar 140 at this stage shows a different set of UI controls including an end control 180 and an overview control 185. The end control 180 is for ending the route inspection mode. In some embodiments, a selection of the end control 180 while the mapping application is operating in the route inspection mode causes the mapping application to switch out of the route inspection mode and back to the map browsing mode. The overview control 185 of some embodiments is for displaying the entire route in the map. A selection of the overview control 185 causes the mapping application to temporarily stop operating in the route inspection mode. The mapping application of some embodiments provides a UI control (not shown) for resuming the route inspection mode. At the second stage 110, the top bar 140 also shows which step of the total steps of the route the UI page 111 is currently displaying. In this example, the step shown in the sign 113 is the first of the five steps of the selected route. The top bar 140 may also show the location information (e.g., address, coordinates, etc.) of the destination location in some embodiments.

The mapping application of some embodiments also displays a section of a route leading up to the juncture with the next step visually differently from other sections of the route. As shown, the section of the route from the starting location pin 190 to the juncture with the first step of the route is highlighted because the next step is the first step of the route.

While operating in the route inspection mode, the mapping application of some embodiments allows the user to slide the signs in and out of the UI page 111 to inspect the steps in the route. For instance, when the user selects the sign 112 and slides the sign 112 to the left of the UI page 111, the sign 114 for the next step will slide in. Alternatively, the mapping application allows the user to manipulate the map (e.g., by zooming in and out, sliding the map in different directions) to display different junctures in the route. For instance, when the user swipes the map with a single touch (as opposed to a multi-touch) in one direction, the mapping application of some embodiments will show another region of the map. If the user keeps swiping the map to display a region of the map containing another juncture that has a step, the sign showing that step will slide into the UI page 111. More details about the mapping application operating in a route inspection mode is described in the U.S. Provisional Application 61/657,858.

The third step 115 illustrates the user selecting the position control 150. In some embodiments, a selection of the position control 150 while the mapping application is operating in the route inspection mode causes the mapping application to switch to the automatic stepping mode. Also, the mapping application of some embodiments displays a region of the map that contains the current location indicator 135. In some embodiments, the mapping application adjusts the zoom level to display the region of the map that contains the current location indicator 135.

The fourth stage 120 illustrates that the UI page 111 shows a juncture associated with the third step of the route. The UI page 111 shows this juncture because this juncture has a step and is the closest juncture with a step to the current location indicator 130. At this stage, the UI 111 is displaying a sign 121 that shows the third step. The UI 111 also shows a portion of the sign 114 for the second step and a portion of a sign 122 for the fourth step of the route. From the previous stage 115 to this stage 120, the sign 113 has slid out of the UI page 111 and the sign 114 has slid in and out of the UI page 111. When the device is held in such a way that shows the UI page 111 in landscape view, more portions of the signs 113 and 122 would be visible in the UI page 111.

This stage 120 also shows that the mapping application has moved the current step indicator 116 to the juncture with the third step of the route. The top bar 140 also indicates that the sign 121 is displayed for the third step of the five steps of the route. The section of the route leading up to this juncture is also highlighted as shown. The stage 120 also shows that the appearance of the position control 150 has changed (e.g., highlighted or displayed in different color) to indicate that the device's current location is being tracked by the mapping application.

In some embodiments, a selection of the end control 180 while the mapping application is operating in the automatic stepping mode causes the mapping application to switch back to the map browsing mode from the route inspection mode. Also, a selection of the overview control 185 while the mapping application is operating in the automatic stepping mode causes the mapping application to stop operating in the automatic stepping mode. Moreover, the mapping application of some embodiments provides a UI control (not shown) for resuming operating in the route inspection mode. A selection of this UI control while the UI page is showing the overview of the loop will cause the mapping application to switch to the route inspection mode even if the mapping application of some embodiments had been operating in the automatic stepping mode before receiving the selection of the overview control 185. In some embodiments, a selection of the resume operation UI control (not shown) for resuming operations in the route inspection mode will cause the mapping application to switch to the automatic stepping mode if the mapping application had been operating in the automatic stepping mode before receiving the selection of the overview control 185 thereby preserving the mode selection.

The fifth stage 125 shows the UI page 111 after the device has moved along the route closer to the destination location. Now the current location indicator 135 is closer to a juncture with the fourth step of the route, the mapping application of some embodiments has moved the current step indicator 116 to this juncture. Also, the mapping application has highlighted the section of the route from the juncture with the third step and to the juncture with the fourth step of the route. The UI page 111 fully displays the sign 122 for the fourth step of the route. The UI page 111 also displays a portion of the sign 121 that has slid out to the left of the UI page 111. The UI page 111 displays a portion of a sign 126 for the fifth and final step of the route.

The current location indicator 135 is depicted as off-centered in the fourth and fifth stages 120 and 125 of FIG. 1 for illustrative purposes. As mentioned above, the mapping application maintains the current location indicator 135 in the center of the UI page.

Figure 2:
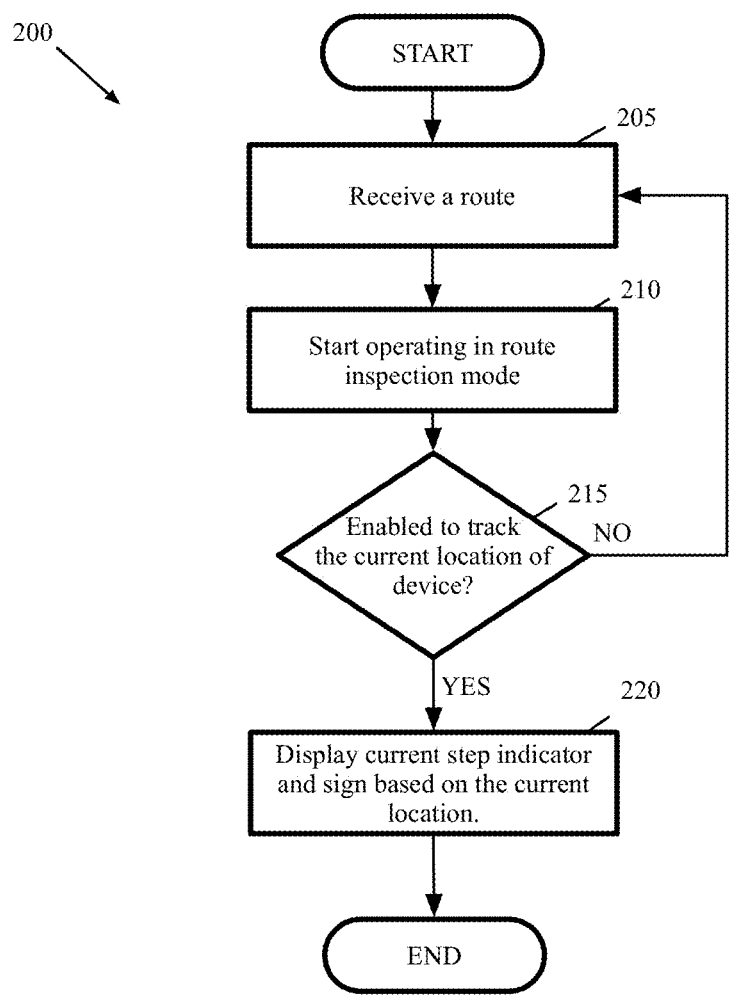
FIG. 2 conceptually illustrates a process that some embodiments perform to switch to the automatic stepping mode from another mode of operation.

FIG. 2 conceptually illustrates a process 200 that some embodiments perform to switch to the automatic stepping mode from another mode of operation. The process 200 is performed by the mapping application of some embodiments. The process starts when the mapping application has computed one or more routes between a starting location and a destination location and selected one of the routes.

The process 200 begins by receiving (at 205) or identifying a selected route. As mentioned above, a route includes one or more junctures and some or all of the junctures in the route has maneuver instructions to display. Next, the process 200 starts (at 210) operating in the route inspection mode. In some embodiments, the process 200 starts (at 210) operating in the route inspection mode upon receiving a selection of a start control such as the start control 170 described above by reference to FIG. 1.

Next, the process 200 determines (at 215) whether the mapping application has been enabled to track the current location of a device on which the mapping application runs. In some embodiments, the process 200 determines that the mapping application has been enabled to track the current location of the device when the mapping application receives a selection of a position control such as the position control 150.

When the process 200 determines (at 215) that the mapping application has not been enabled to track the current location of the device, the process 200 loops back to 210 to continue operating in the route inspection mode. Otherwise, the process 200 proceeds to 220 to start operating in the automatic stepping mode. More specifically, the process 200 displays a sign and the current step indicator on a juncture associated with a step that is closest to the current location of the device. The process then ends.

In some embodiments, the process 200 performs the operation 215 before performing the operation 210. That is, the process 200 can determine whether the mapping application is enabled for tracking the current location of device before starting to operate in the route inspection mode.

B. Displaying Sign and Moving Current Step Indicator

Figure 3:
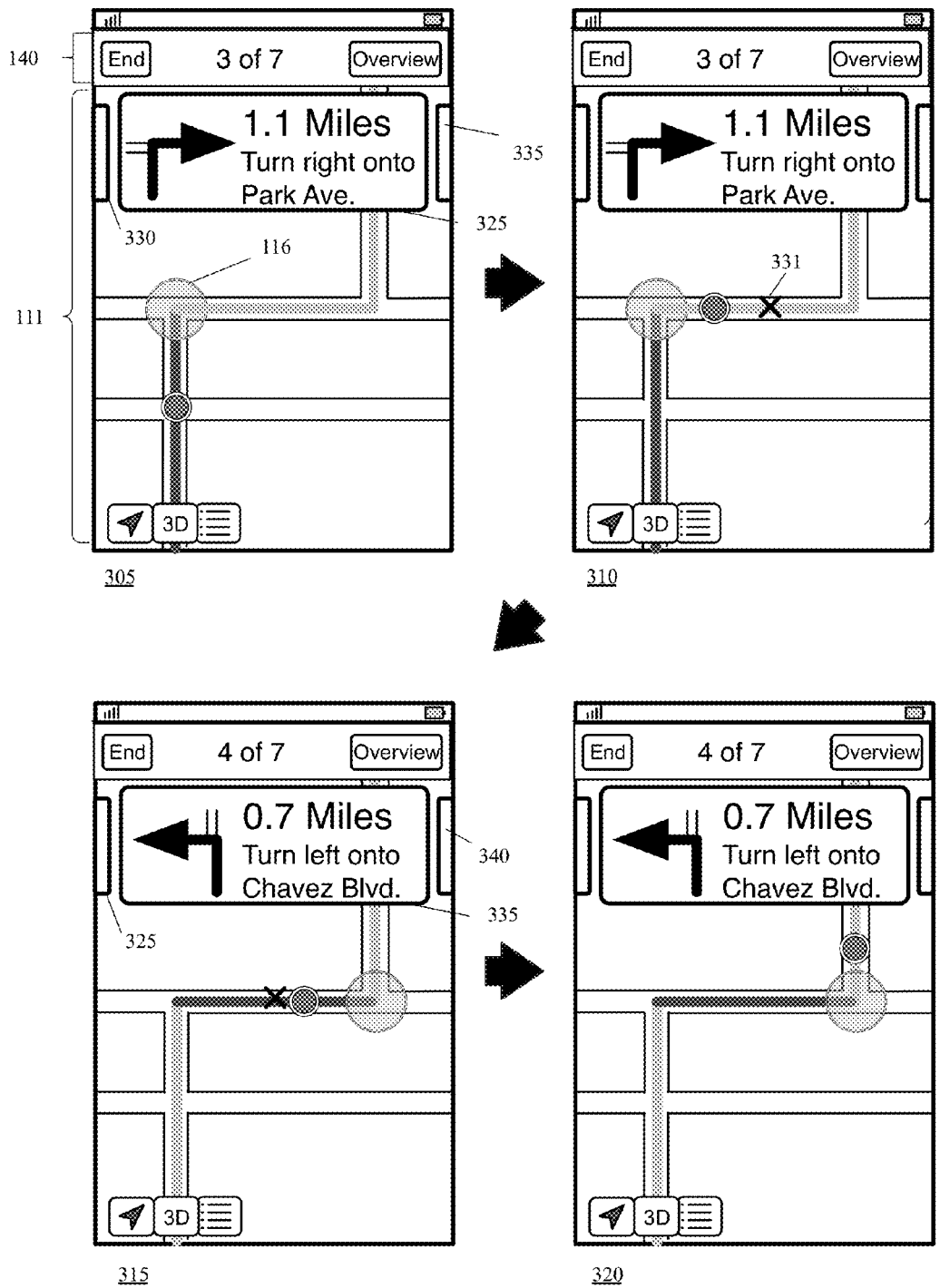
FIG. 3 illustrates that the mapping application that runs in a device is operating in the automatic stepping mode.

FIG. 3 illustrates in four different stages 305-320 that the mapping application that runs in a device operating in the automatic stepping mode. Specifically, this figure shows the mapping application of some embodiments operating in the automatic stepping mode automatically slides signs for steps in and out of a UI page and moves a current step indicator from one juncture to another based on the current location of the device.

At the first stage 305, the device is moving towards a juncture with the third step of the seven steps of a route that the mapping application is automatically stepping through currently. As shown in the first stage 305, the position control 150 is highlighted to indicate that the mapping application is tracking the current location of the device. The UI page 111 displays a region of a map that includes the current location of the device. The UI page 111 displays a sign 325 for displaying the third step. The UI page 111 also displays a portion of a sign 330 for displaying the second step of the route and a portion of a sign 335 for displaying the fourth step of the route. As mentioned above, the mapping application of some embodiments maintains the current location indicator 135 in the center of the UI page 111.

Figure 21:
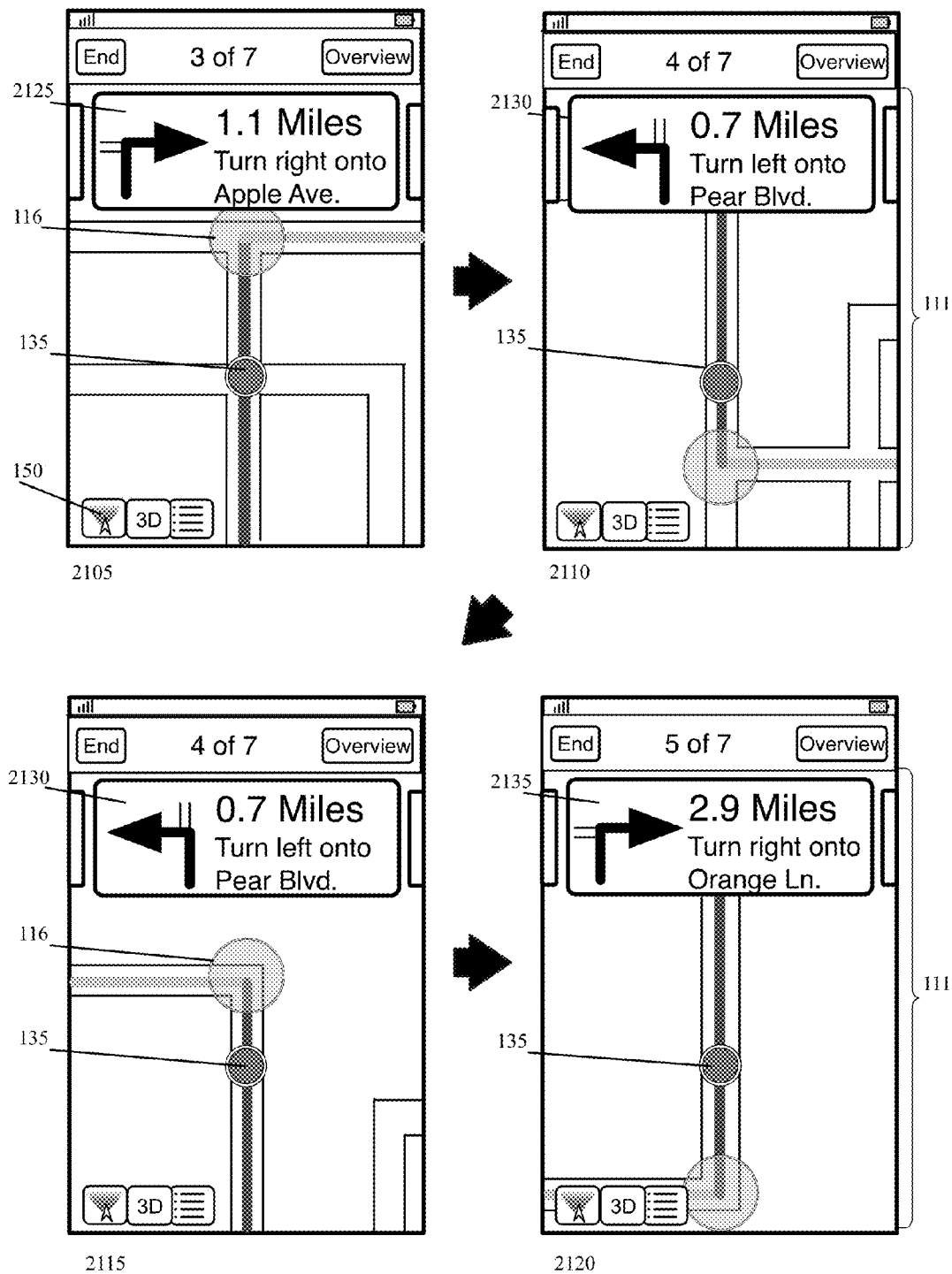
FIG. 21 illustrates the actual display that a user sees on their device in some embodiments.

It is to be noted that some figures of this application do not show that the current location indicator 135 is maintained at the center of a UI page for simplicity of discussion even though these figures are meant to illustrate the mapping application of some embodiments that does maintain the current location indicator 135 in the middle of the UI page. Also, the mapping application of some embodiments orients the region of the map to display in the UI page such that the direction in which the device is advancing is shown vertically above the current location indicator 135. Some figures of this application do not depict reorientation of the map. FIG. 21 further below accurately depicts the UI pages and the current location indicator of the mapping application of these embodiments correctly.

In some embodiments, the mapping application displays a sign for a particular step and keeps the current step indicator 116 at a juncture that has the particular step until the device moves closer to another juncture that has the step after the particular step in the route. In some such embodiments, the mapping application identifies a midpoint between these two junctures and uses that midpoint to determine whether the current location of the device is closer to one or the other of the junctures. Different embodiments identify the midpoint between two junctures differently. For instance, some embodiments use a displacement between the two junctures. Other embodiments use the length of the computed traveling path between the two junctures.

The second stage 310 shows a midpoint 311 identified by the mapping application. The mapping application of some embodiments does not display the midpoint 311 in the UI pages. As shown in this stage 310, the device has moved past the juncture with the third step by following the third step (i.e., the maneuver instruction to turn right at the juncture) but has not gone past the midpoint 311 towards the juncture with the fourth step.

The third stage 315 shows that the device has moved past the midpoint 311 and is now closer to the juncture with the fourth step than the juncture with the third step. The mapping application of some embodiments thus slides out the sign 325 to the left of the UI page 111 and slides in the sign 335 from the right. As shown, the sign 335 displays the fourth step. The mapping application has moved the current step indicator from the juncture with the third step to the juncture with the fourth step. Also, the section of the route from the juncture with the third step and the juncture with the fourth step is highlighted. The top bar 140 also indicates that the sign 335 that is fully displayed in the UI 111 shows the fourth step of the seven steps of the route.

The fourth stage 320 shows that the device has moved past the juncture with the fourth step in the route by following the fourth step (i.e., to turn left at the juncture). The device has not reached the midpoint between the juncture with the fourth step and a juncture with the fifth step. The mapping application keeps displaying the sign 335 and does not move the current step indicator 116 from the juncture with the fourth step. The mapping application also displays a portion of a sign 340 for displaying the fifth step.

Figure 4:
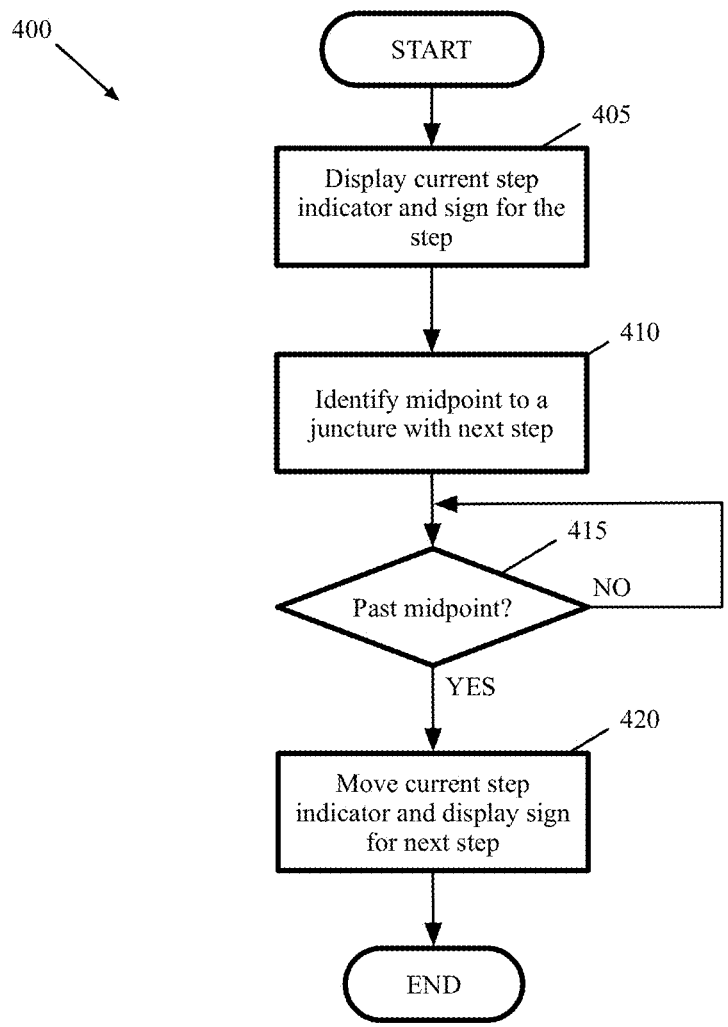
FIG. 4 conceptually illustrates a process that some embodiments perform to slide signs for steps in and out of a UI page of a mapping.

FIG. 4 conceptually illustrates a process 400 that some embodiments perform to slide signs for steps in and out of a UI page of a mapping application and to move a current location indicator from one juncture to another based on the current location of a device in which the mapping application runs. The process 400 is performed by the mapping application of some embodiments. The process 400 starts when the mapping application is operating in the automatic stepping mode. That is, the process 400 is performed while the mapping application is tracking the current location of the device.

The process 400 begins by displaying (at 405) a current step indicator at a particular juncture with a particular step that is closest to the current location of the device. Also at 405, the process 400 displays a particular sign for the particular step. The process 400 then identifies (at 410) the midpoint to the juncture with the next step. The process 400 of some embodiments draws a straight line between the two junctures and identifies the midpoint of the straight line as the midpoint to the juncture with the next step. In some embodiments, the process 400 identifies the length of the traveling path from the particular juncture to the juncture with the next step and a point on the route that is away from the particular juncture by half of the identified length is identified as the midpoint.

Next, the process 400 determines (at 415) whether the device has gone past the identified midpoint towards the juncture with the next step. When the process determines (at 415) that the device has not gone past the midpoint, the process 400 loops at 415 to wait for the device to go past the midpoint towards the juncture with the next step. The process 400 therefore keeps displaying the particular sign and keeps the current step indicator at the particular juncture.

When the process determines (at 415) that the device has gone past the identified midpoint, the process displays (at 420) the sign for the next step and moves the current step indicator from the particular juncture to the juncture with the next step. The process 400 then ends.

Figure 5:
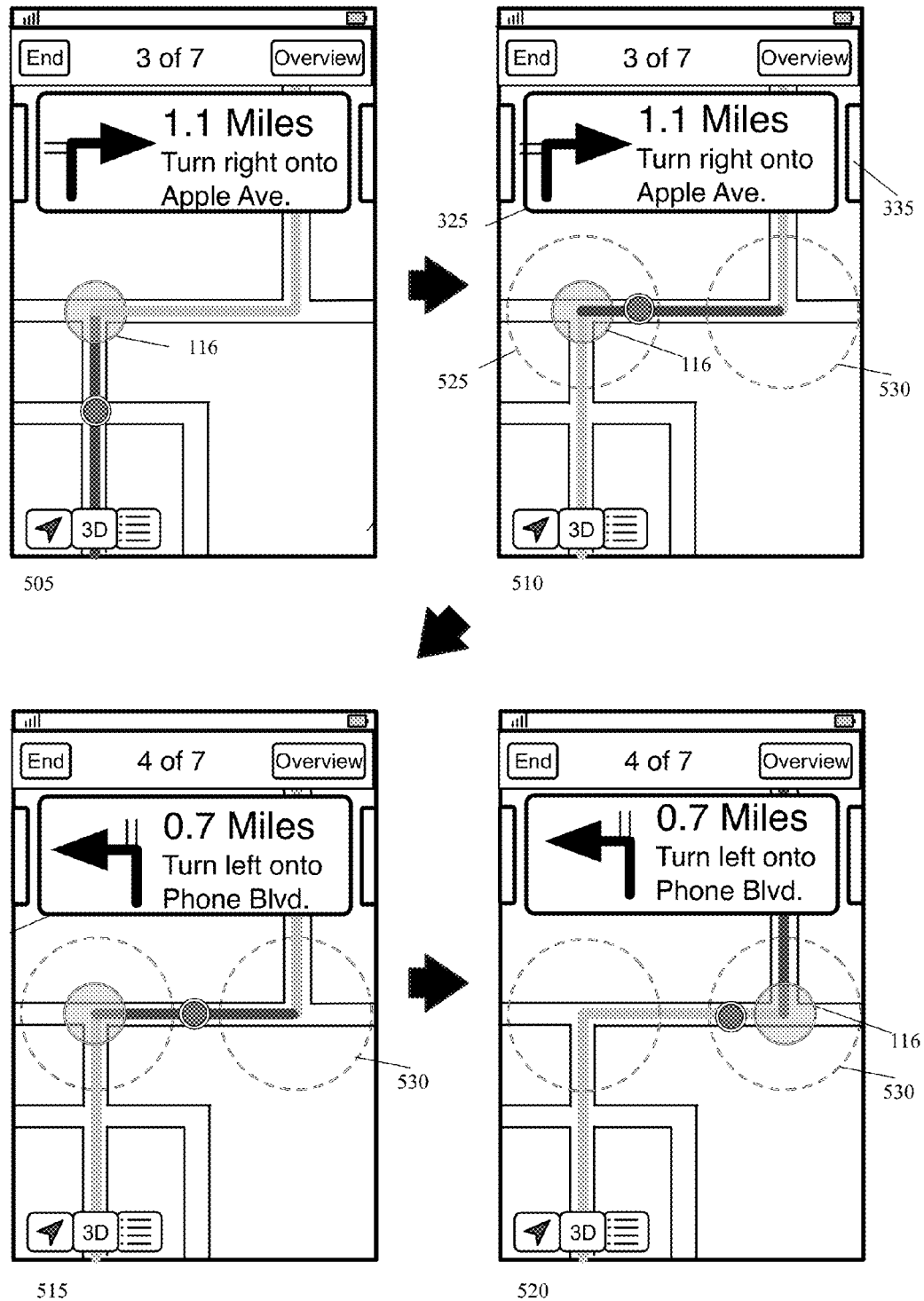
FIG. 5 illustrates in four different stages the mapping application of some embodiments operating in the automatic stepping mode.

FIG. 5 illustrates in four different stages 505-520 that the mapping application of some embodiments operating in the automatic stepping mode automatically slides signs for steps in and out of a UI page and moves a current location indicator from one juncture to another based on the current location of the device.

The first stage 505 is identical with the stage 305 described above by reference to FIG. 3. In some embodiments, the mapping application displays a sign for a particular step and keeps the current step indicator 116 at a juncture that has the particular step until the device moves closer to another juncture that has the next step following the particular step in the route. In some such embodiments, the mapping application defines a range for each juncture with a step in the route by drawing a circular range that has the juncture at the circle's center. The circular range is invisible in some embodiments. That is, the circular range is not displayed in the UI page 111. In some embodiments, the mapping application moves the current step indicator 116 to a particular juncture as the device enters the circular range of the particular juncture and keeps the step indicator at the particular juncture until the device enters the circular range of a juncture with the step after the particular step in the route.

In some such embodiments, the mapping application displays a particular sign for the particular step for the particular juncture as the device moves out of the circular range of the juncture that has the step previous to the particular step in the route and moves towards the particular juncture. The mapping application of these embodiments keeps displaying the particular sign in the UI page until the device moves out of the circular range of the particular juncture towards the juncture that has the step after the particular step in the route.

In some embodiments, the radius for a circular range is uniform for any juncture with a step in the route. In some such embodiments, the mapping application defines different radius based on the transport type for which the route is computed. For instance, the mapping application uses a relatively short radius (e.g., tens of meters) for the junctures of the route computed for walking direction. The mapping application uses a relatively long radius (e.g., hundreds of meters) for the junctures of the route computed for driving direction.

The second stage 510 shows two circular ranges 525 and 530 for the two junctures of the route that have two consecutive steps in the route. After the previous stage 505, the device has moved along the path from the location of the device at the previous stage 505 to a location indicated by the current location indicator 135 shown in the second stage 510. That is, the device has made a right turn at the juncture with the third step of the route. The device also has entered the circular range 525 for the juncture with the third step but has not exited the circular range 525. Therefore, the mapping application of some embodiments keeps displaying the sign 325 for the third step. The mapping application also keeps the current step indicator 116 at the juncture with the third step.

The third stage 515 shows that the device has moved out of the circular range 525 and is moving towards the juncture with the fourth step. The device has not yet entered the circular range 530 for the juncture with the fourth step. Because the device has exited the circular range 525 and is moving towards the circular range 530, the mapping application of some embodiments displays the sign 335 for displaying the fourth step of the route. However, the mapping application still displays the current step indicator 116 at the juncture with the third step because the device has not entered the circular range for the juncture with the fourth step of the route.

The fourth stage 520 shows that the device has entered the circular range 530 for the juncture with the fourth step. The mapping application of some embodiments has thus moved the current step indicator 116 from the juncture with the third step as shown. The mapping application of some embodiments operating in the automatic stepping mode does not have or update estimated time of arrival (ETA), time remaining to get to the destination location, or distance remaining to the destination location or the next juncture associated with a step as the device moves along the route. This is because the mapping application operating in the automatic stepping mode displays static signs on which the information does not change in some embodiments.

Figure 6:
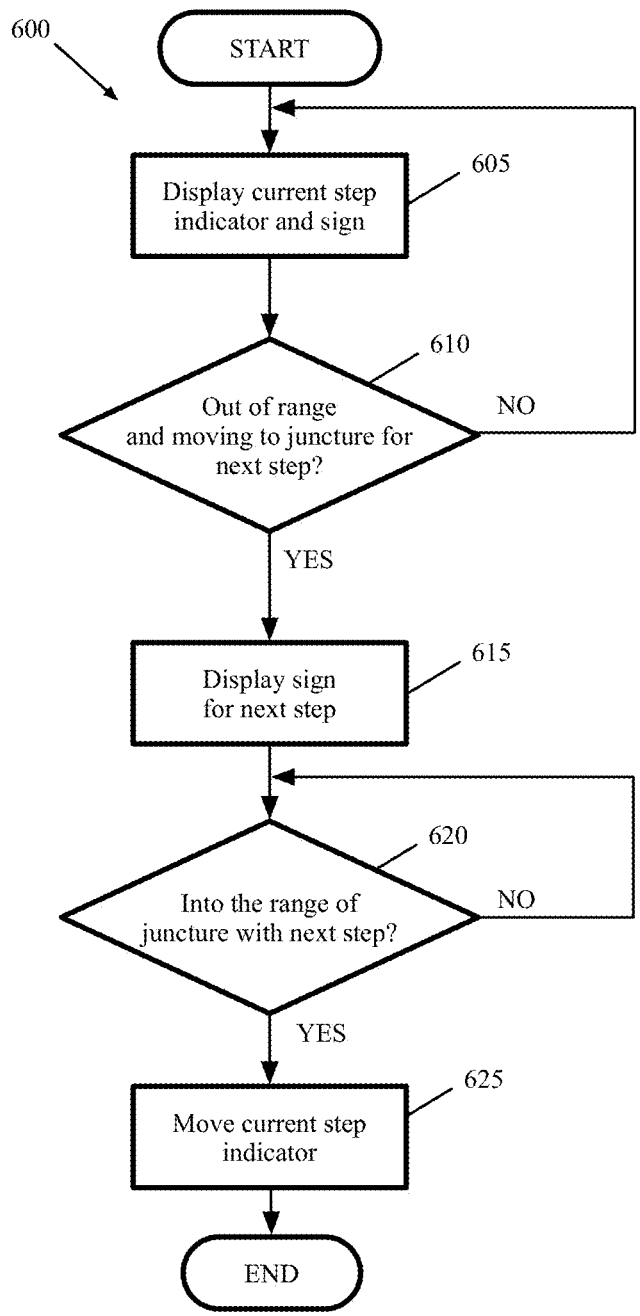
FIG. 6 conceptually illustrates a process that some embodiments perform to slide signs for steps in and out of a UI page of a mapping application.

FIG. 6 conceptually illustrates a process 600 that some embodiments perform to slide signs for steps in and out of a UI page of a mapping application and to move a current step indicator from one juncture to another based on the current location of a device in which the mapping application runs. The process 600 is performed by the mapping application of some embodiments. The process 600 starts when the mapping application is operating in the automatic stepping mode. That is, the process 600 is performed while the mapping application is tracking the current location of the device. In particular, the process 600 starts when the current location of the device is within a particular circular range of a particular juncture for a particular step of the route.

The process 600 begins by displaying (at 605) a current step indicator at the particular juncture. Also at 605, the process 600 displays the particular sign for showing the particular step. The process then determines (at 610) whether the device has moved out of the circular range of the particular juncture and is moving towards the juncture with the next step. In some embodiments, the process computes a vector from a previous position of the device to the current position of the device and determines whether the vector is pointing towards the juncture with the next step (i.e., whether the vector is pointing to the center of the circular range for the juncture with the next step). If the vector is directed to the juncture, the process determines that the device is moving towards the juncture. Otherwise, the process determines that the device is not moving towards the juncture. Alternatively or conjunctively, the process compares the distance from the previous position to the juncture and the distance from the current position to the juncture. If the distance from the current position to the juncture is shorter than the distance from the previous position to the juncture, the process determines that the device is moving towards the juncture. Otherwise, the process determines that the device is moving away from the juncture.

When the process 600 determines that the device is not out of the circular range for the particular juncture or is not moving towards the juncture with the next step, the process 600 loops back to 605 to keep displaying the current step indicator at the particular juncture and to keep displaying the particular sign for the particular step. When the process 600 determines that the device has moved out of the circular range for the particular juncture and is moving towards the juncture with the next step, the process 600 displays (at 615) the sign for the next step.

Next, the process 600 determines (at 620) whether the device has entered the circular range of the juncture with the next step. When the process 600 determines (at 620) that the device has not entered the circular range of the juncture with the next step, the process loops at 620 to keep displaying the current step indicator at the particular juncture and displaying the sign for the next step in the UI page. Otherwise, the process 600 proceeds to 625 to move the current step indicator to the juncture with the next step. The process 600 then ends.

Figure 7:
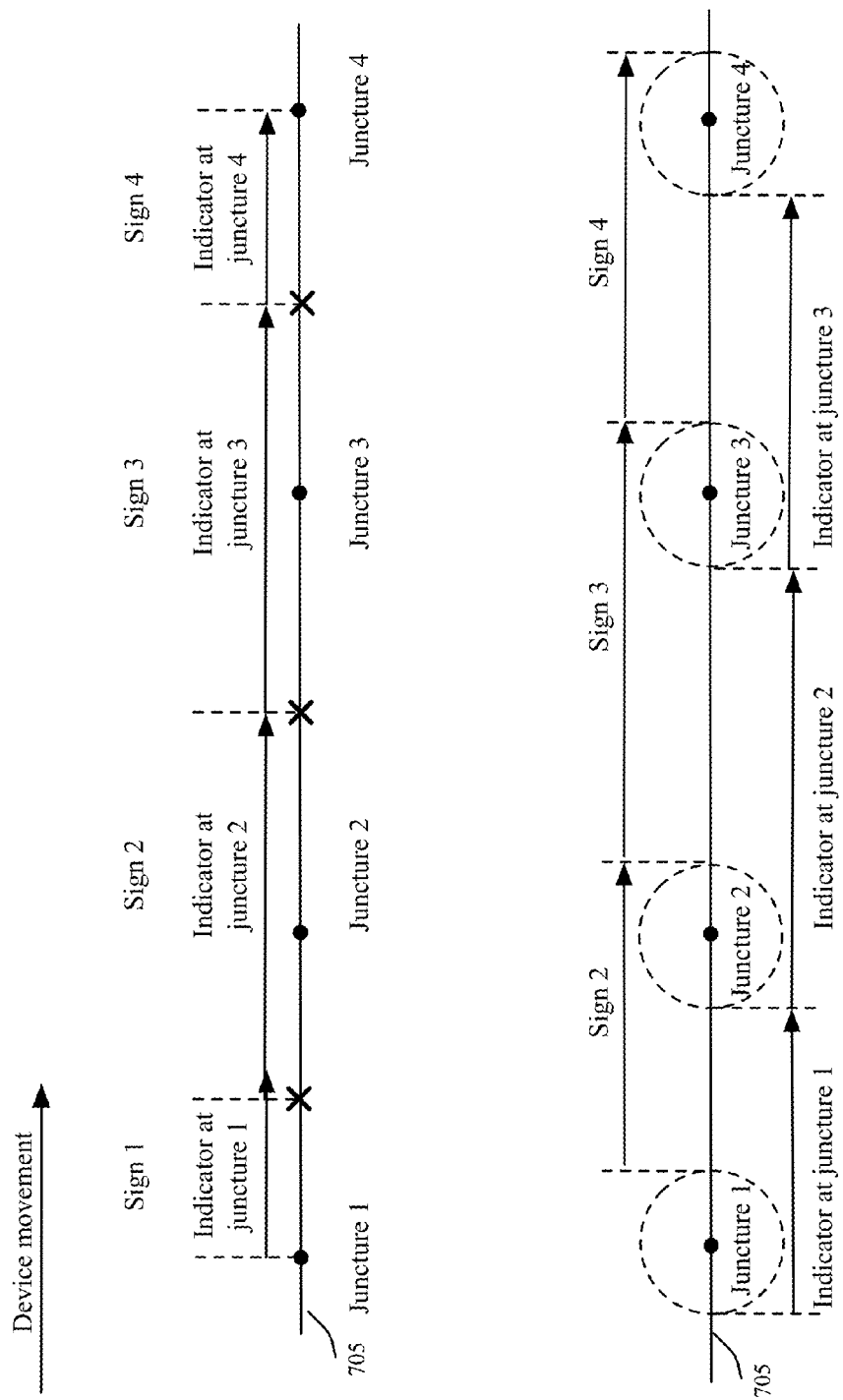
FIG. 7 conceptually illustrates displaying a current step locator and a sign for a step to display.

FIG. 7 conceptually illustrates displaying a current step locator and a sign associated with a step. Specifically, this figure illustrates several junctures associated with several consecutive steps of a route in one-dimension. This figure illustrates lines 700 and 705 that each includes junctures 1-4. Each of the two lines 700 and 705 one-dimensionally represents the same section of a route that includes the junctures 1-4 depicted as dots on the lines. The top half of this figure illustrates displaying of current step indicator and sign in some embodiments. The bottom half of this figure illustrates displaying of the current step indicator and sign in other embodiments. The X marks on the top line represents midpoints between two junctures with consecutive steps. For simplicity of discussion, it is assumed that the direction of the movement of the device is always left to right (i.e., from one juncture with a step to another juncture with the next step).

In the top half of the figure, the mapping application of some embodiments displays sign for a particular juncture and places the current step indicator at the particular juncture, when the particular juncture is closest juncture to the moving device. As shown, the mapping application of some embodiments identifies a midpoint between two junctures with two consecutive steps of the route. The sign 1 for the juncture 1 is displayed when the device is at a location between the juncture and the midpoint between the junctures 1 and 2. The sign 2 is displayed when the devices is between the midpoint of the junctures 1 and 2 and the midpoint of the junctures 2 and 3. The mapping application then displays the sign for the step for the juncture 3 when the device is between the midpoint of the junctures 2 and 3 and the midpoint of the junctures 3 and 4. The mapping application displays the sign 4 once the device goes past the midpoint between the junctures 3-4.

Also, the mapping application displays the current step indicator at the juncture 1 until the device moves past the midpoint of junctures 1 and 2. The mapping application moves the current step indicator to the juncture 2, when the device goes past the midpoint between junctures 1 and 2. The mapping application keeps the current step indicator at the juncture 2 until the device goes past the midpoint between junctures 2 and 3. The mapping application moves the current step indicator to the juncture 3 when the device goes past the midpoint of the junctures 2 and 3. The mapping application then moves the current step indicator to the juncture 4 when the device goes past the midpoint between junctures 3 and 4.

A threshold distance for the mapping application to use in order to determine the placement of signs and the placement of the current step indicator is a midpoint between two junctures with two consecutive steps. Therefore, the threshold distance varies from one juncture to another.

In the bottom half of the figure, the mapping application of some embodiments defines a circular range for each of the junctures 1-4. As shown, the radii of the circular ranges are identical. The mapping application of some embodiments displays the current step indicator at a particular juncture with a particular step when the device is within the circular range of the particular juncture. Also, the mapping application of these embodiments displays the sign for the particular step when the device is within the circular range of the particular juncture. For instance, when the device is within the circular range of the juncture 2, the mapping application displays sign 2 for the step for the juncture 2 and keeps the current step indicator at the juncture 2.

In some embodiments, the mapping application starts displaying the sign for the next step when the device leaves the circular range of the particular juncture. This sign for the next step will be displayed until the device enters and leaves the circular range of the juncture with the next step. For instance, the mapping application starts displaying the current step indicator at juncture 2 when the device enters the circular range of juncture 2. The mapping application displays the current step indicator at juncture 2 until the device enters the circular range of juncture 3.

Mixtures and variations of different embodiments described so far are possible. For instance, the mapping application of some embodiments may use the midpoint between two junctures with two consecutive steps of the route to determine at which juncture to keep the current step indicator. The mapping application of these embodiments also uses the circular ranges for displaying different signs. That is, these embodiments manage the placement of the current step indicator according to the embodiments described by reference to the top half of this figure. These embodiments also manage displaying of the sign for the next step according to the embodiments described by reference to the bottom half of this figure.

C. Overlapping Circular Ranges

Figure 8:
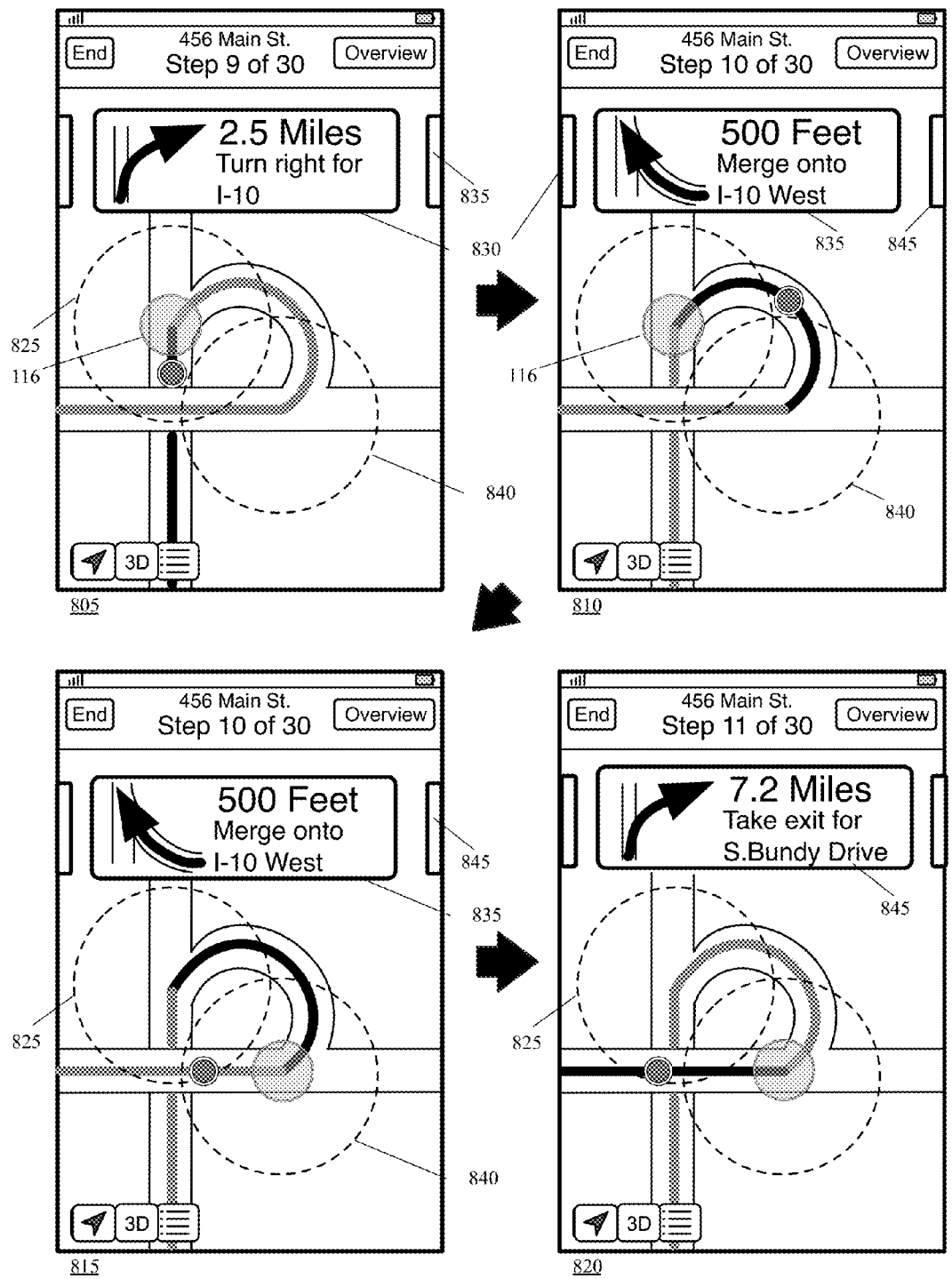
FIG. 8 illustrates that the mapping application of some embodiments operating in the automatic stepping mode does not backtrack when displaying signs and the current step indicator.

FIG. 8 illustrates in four different stages 805-820 that the mapping application of some embodiments operating in the automatic stepping mode does not backtrack when displaying signs and the current step indicator when the junctures with steps are closely located. Specifically, this figure illustrates a movement of a device on which the mapping application is running along a ramp that leads to a highway.

At the first stage 805, the device is moving towards a juncture with the ninth step of the thirty steps of a route that the mapping application is automatically stepping through currently. The device has moved into a circular range of this juncture 825 of this juncture and thus the mapping application displays a sign 830 for the ninth step and places the current step indicator 116 at this juncture.

The second stage 810 shows that the device has moved out of the circular range 825 and moving towards the juncture with the tenth step of the route. The mapping application is therefore displaying a sign 835 for the tenth step. Because the device has not entered a circular range 840 for the juncture with the tenth step, the mapping application keeps the current step indicator 116 at the juncture with the ninth step.

The third stage 815 shows that the device has moved past the juncture with the tenth step but has re-entered the circular range 825 of the ninth step while the device is still in the circular range 840. In this situation, the mapping application determines whether the circular range 825 that the device has just entered while being in the circular range 840 is a circular range for a juncture with a step earlier than the tenth step of the route. The mapping application of some embodiments compares the location information (e.g., at least two of the three-dimensional coordinates) of the juncture with the ninth step with the location information of the junctures with steps previous to the tenth step in the route. The mapping application would determine that the juncture is a previous step if the location information of the juncture matches with any of the junctures of the previous steps. Because the juncture with the ninth step is a juncture with a previous step relative to the juncture with the tenth step, the mapping application keeps the sign 835 for the tenth step and does not move the current step indicator to the juncture with the ninth step.

The fourth stage 820 shows that the device has moved out of the circular range 840 of the juncture with the tenth step. The device is still in the circular range 825 of the juncture with the ninth step. The mapping application of some embodiments ignores the fact that the device is in the circular range 825. The mapping application displays a sign 845 for the eleventh step because the device has exited the circular range 840 and is moving towards the juncture with the eleventh step.

Figure 9:
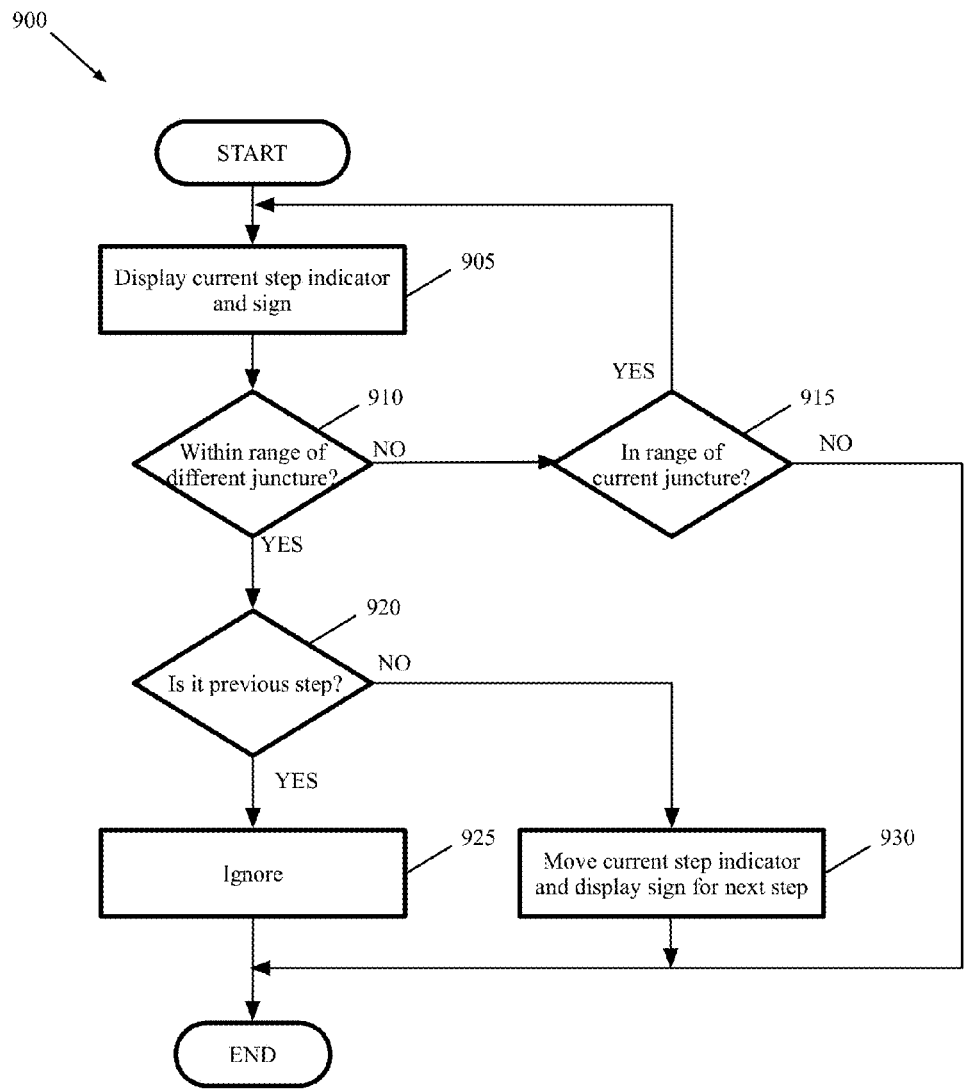
FIG. 9 conceptually illustrates a process that some embodiments perform to avoid backtracking in displaying signs and moving a current location indicator when the circular ranges overlap.

FIG. 9 conceptually illustrates a process 900 that some embodiments perform to avoid backtracking when displaying signs and moving a current location indicator in situations where the circular ranges overlap. The process 900 is performed by the mapping application of some embodiments that runs on a device. The process 900 starts when the mapping application is operating in the automatic stepping mode. That is, the process 900 is performed while the mapping application is tracking the current location of the device. In particular, the process 900 starts when the current location of the device is within a particular circular range of a particular juncture for a particular step of the route.

The process 900 begins by displaying (at 905) a current step indicator at the particular juncture. Also at 905, the process 900 displays a particular sign for showing the particular step. The process then determines (at 910) whether the device has moved into a circular range of a juncture that is different than the particular juncture. That is, the process 900 determines (at 910) whether the device has entered a circular range of another juncture while in the circular range of the particular juncture.

When the process 900 determines (at 910) that the device has entered the circular range of another juncture, the process proceeds to 920, which will be described further below. When the process 900 determines (at 910) that the device has not entered the circular range of another juncture, the process determines (at 915) whether the device is within the particular circular range. When the process determines (at 915) that the device is still within the particular circular range, the process loops back to 905 to keep displaying the particular sign and keeps the current step indicator at the particular juncture. Otherwise, the process ends.

When the process 900 determines (at 910) that the device has entered the circular range of another juncture, the process determines (at 920) whether this juncture is a juncture with a step that is a previous step to the particular step in the route. The process 900 of some embodiments compares the location information (e.g., at least two of the three-dimensional coordinates—longitudinal, latitudinal, and altitudinal coordinates) of the juncture with the location information of the junctures with steps previous to the particular step in the route. The process 900 would determine that the juncture has a previous step if the location information of the juncture matches with any of the juncture with a previous step. Alternatively or conjunctively, the process 900 assigns an identifier to each juncture with a step in the route and uses the identifiers to determine whether the juncture is a juncture with a previous step.

When the process determines (at 920) that the device is in a range of a juncture with a previous step while being in the range of the particular juncture, the process (at 925) ignores the fact that the device is in the range of the juncture that is different than the juncture of which the device is within the range. That is, the process 900 (at 925) would not display a different sign nor move the current step indicator to another juncture.

When the process determines (at 920) that the device in a range of a different juncture with a step that is not a previous step while being in the range of the particular juncture, the process 900 moves the current step indicator to the different juncture and displays the sign for the step of the different juncture. The process then ends.

D. Straying Away from Route

Figure 10:
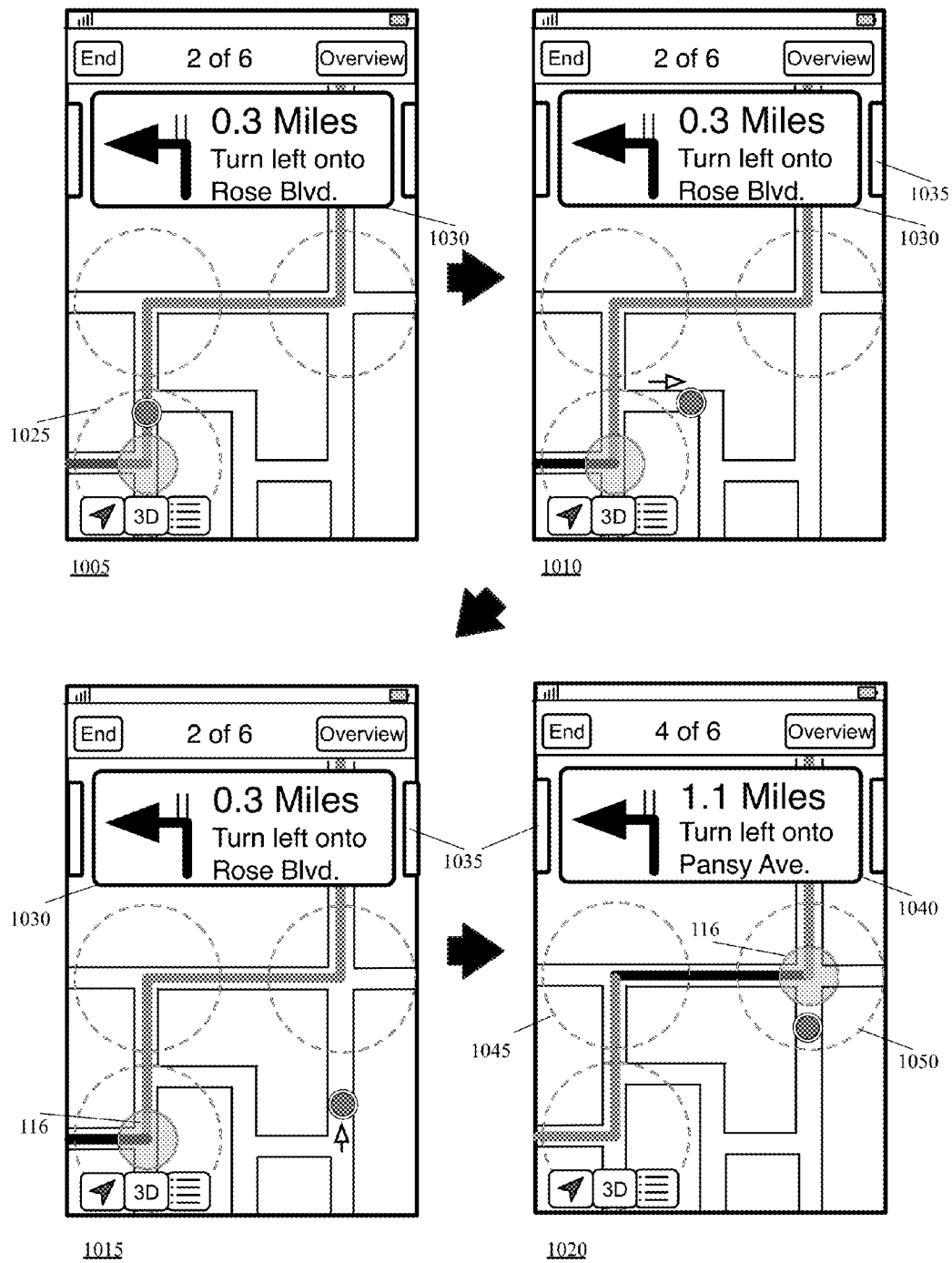
FIG. 10 illustrates a manner in which the mapping application running on a device displays signs and moves current step indicator.

FIG. 10 illustrates in four different stages 1005-1020 the manner in which the mapping application running on a device displays signs and moves the current step indicator when the device is straying away from a route. The consecutive steps are the second, the third, and the fourth steps of the route.

The first stage 1005 shows three junctures with the three consecutive steps of the route. At this stage, the device is in a circular range 1025 of the juncture with the second step of the route. The mapping application is displaying a sign 1030 for the second step.

The second stage 1010 shows that the device has exited the circular range 1025 but is not moving towards the juncture with the third step. The mapping application of some embodiments does not fully display a sign 1035 for the third step because the device is not moving towards the juncture with the third step. The mapping application of some embodiments keeps displaying the sign 1030 for the second step and maintains the current step indicator 116 at the juncture with the second step as shown.

The third stage 1015 shows that the device is moving towards the juncture with the fourth step. The mapping application of some embodiments keeps displaying the sign 1030 for the second step and maintains the current step indicator 116 at the juncture with the second step as shown. The mapping application of other embodiments at this point slide in the sign 1035 for the third step because the device is getting closer to the juncture with the third step as well even though the movement of the device is not directed to the juncture. The arrow with an empty arrowhead represents the direction of the movement of the device. The mapping application of some embodiments does not display this arrow.

The fourth stage 1020 shows that the device has entered the circular range 1050 of the juncture with the fourth step. The mapping application of some embodiments thus displays a sign 1040 for the fourth step by sliding out the sign 1030 for the second step and by quickly sliding in and then out the sign 1035 for the third step. The mapping application also moves the current step indicator 116 from the juncture with the second step to the juncture with the fourth step as shown. The mapping application of some embodiments thus skipped the juncture for the third step because the device avoided the circular range 1045 of the juncture with the second step. The fourth step that is displayed in the sign 1040 is a maneuver instruction to take a left turn because this step is generated for a device that is "on" the route (i.e., a device coming from the juncture with the third step).

Figure 11:
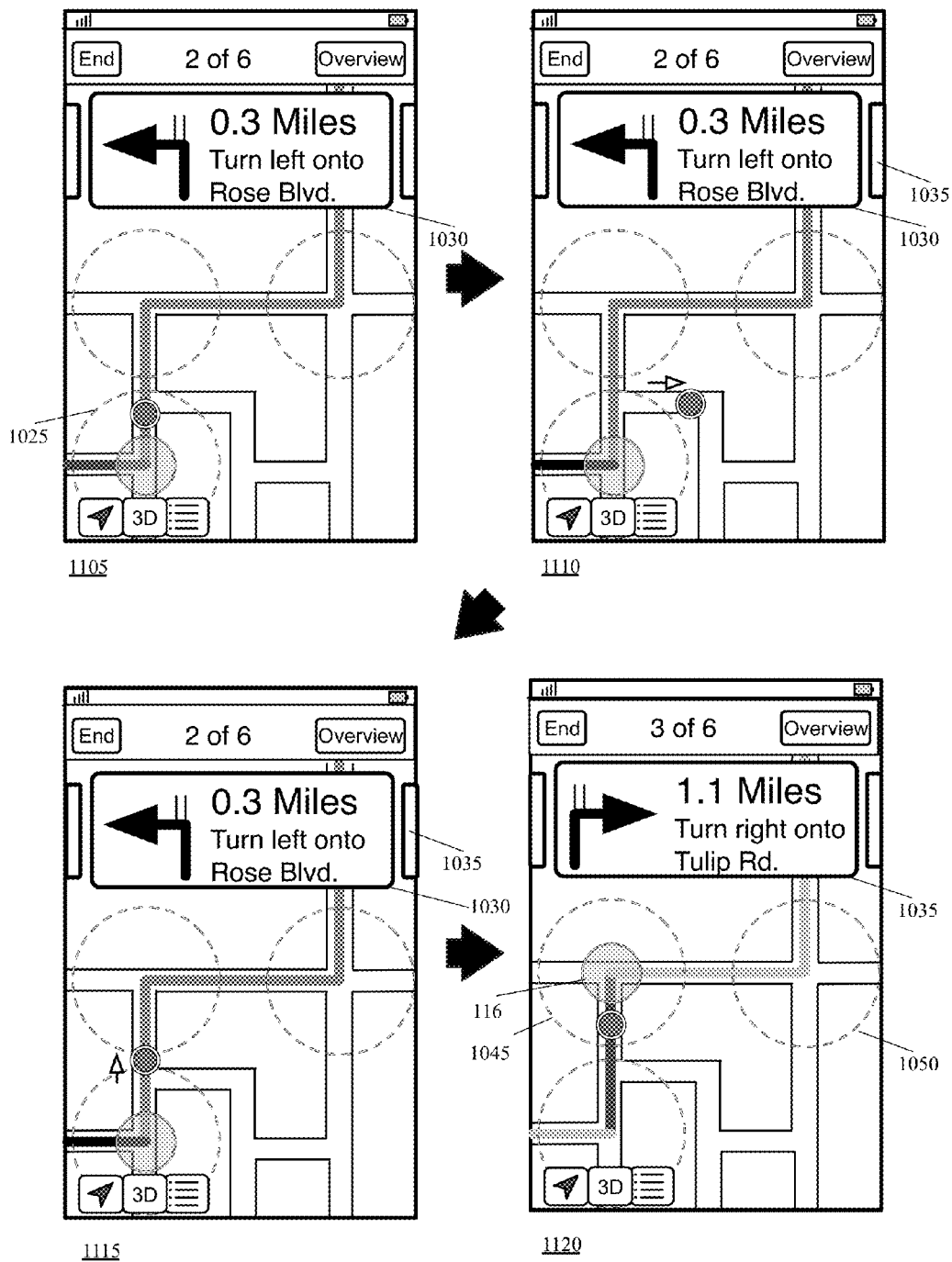
FIG. 11 illustrates a manner in which the mapping application running on a device displays signs and moves current step indicator.

FIG. 11 illustrates in four different stages 1105-1120 the manner in which the mapping application running on a device displays signs and moves the current step indicator when the device strays away from a route and then comes back on the route. This route is the same route described FIG. 10. The first two stage 1105 and 1110 are identical with the stages 1005 and 1010.

The third stage 1115 shows that the device has changed the direction of the movement (e.g., by making a U-turn) and is now moving towards the juncture with the third step of the route. However, the mapping application of some embodiments does not slide in the sign 1035 for the third step because the device had moved away from the juncture when the device exited the circular range 1025 of the juncture with the second step. In other embodiments, the mapping application may slide in the sign 1035 because the device is moving towards the juncture with the third step.

The fourth stage 1120 shows that the device has entered the circular range 1045 of the juncture with the third step. The mapping application of some embodiments displays slides in the sign 1035 for the third step. The mapping application has also moved the current step indicator 116 to the juncture with the third step.

Figure 12:
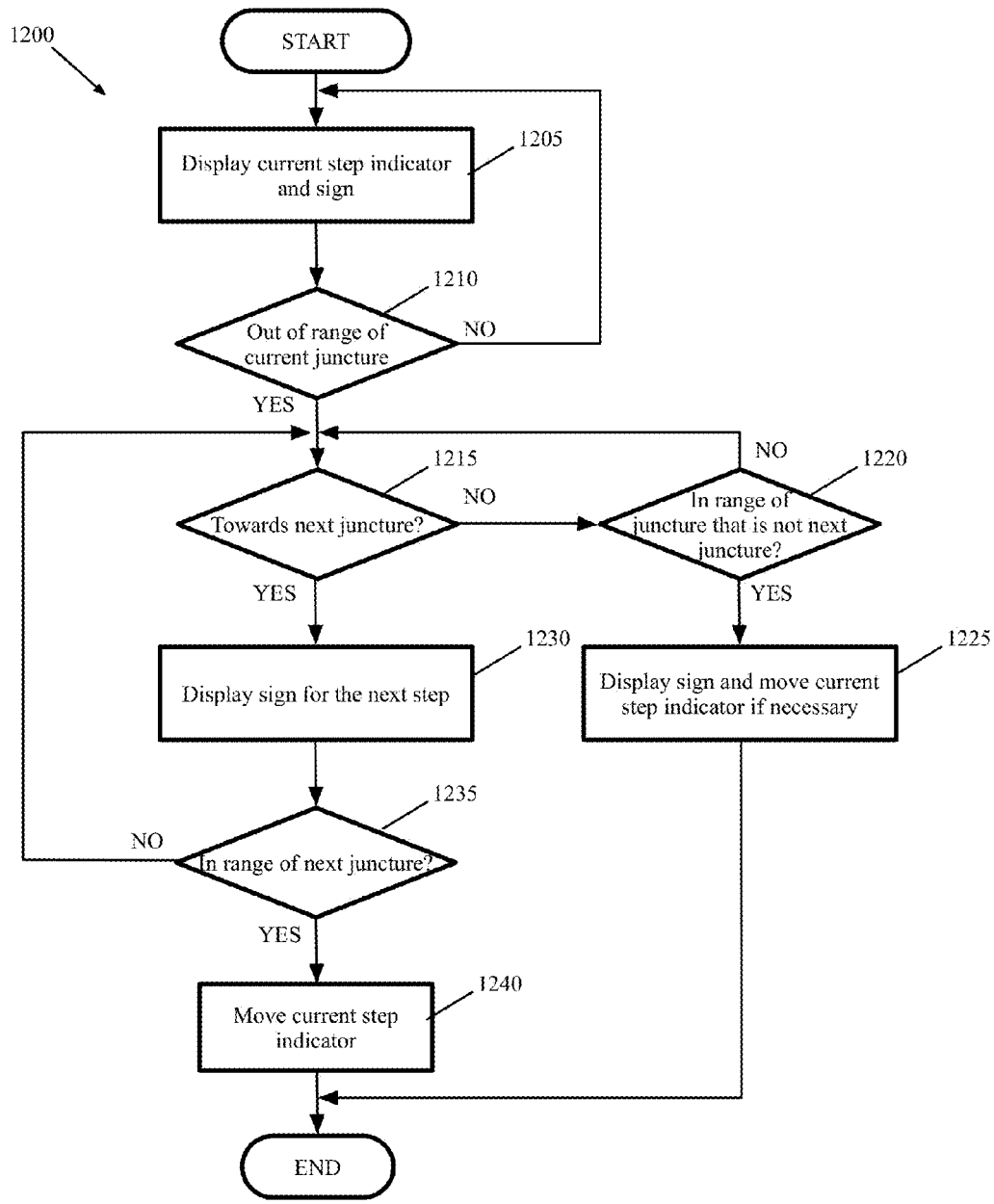
FIG. 12 conceptually illustrates a process that some embodiments perform to display signs and move current step locator when a device strays away from a route.

FIG. 12 conceptually illustrates a process 1200 that some embodiments perform to display signs and move the current step indicator when a device strays away from a route. The process 1200 is performed by the mapping application of some embodiments that runs on the device. The process 1200 starts when the mapping application is operating in the automatic stepping mode. That is, the process 1200 is performed while the mapping application is tracking the current location of the device. In particular, the process 1200 starts when the current location of the device is within a particular circular range of a particular juncture for a particular step of the route.

The process 1200 begins by displaying (at 1205) a current step indicator at the particular juncture. Also at 1205, the process 1200 displays a particular sign for showing the particular step. The process then determines (at 1210) whether the device has moved out of the particular circular range of the particular juncture. When the process determines (at 1210) that the device has not moved out of the particular range, the process loops back to 1205 to keep displaying the particular sign and to keep the current step indicator at the particular juncture.

When the process 1200 determines (at 1210) that the device has moved out of the particular range, the process 1200 determines (at 1215) whether the device is moving towards the juncture corresponding to the next step. Different embodiments determine the movements towards the juncture differently. In some embodiments, the process computes a vector from a previous position of the device to the current position of the device and determines whether the vector is pointing towards the juncture associated with the next step (i.e., whether the vector is pointing to the center of the circular range for the juncture with the next step). If the vector is directed to the juncture, the process determines that the device is moving towards the juncture. Otherwise, the process determines that the device is not moving towards the juncture. Alternatively or conjunctively, the process compares the distance from the previous position to the juncture and the distance from the current position to the juncture. If the distance from the current position to the juncture is shorter than the distance from the previous position to the juncture, the process determines that the device moving towards the juncture. Otherwise, the process determines that the device is moving away from the juncture.

When the process 1200 determines (at 1215) that the device is moving towards the juncture with the next step, the process 1200 proceeds to 1230, which will be described further below. When the process 1200 determines (at 1215) that the device is not moving towards the juncture with the next step, the process 1200 determines (at 1220) whether the device has entered a circular range of a juncture that is not the juncture with the next step. Such a juncture may be a juncture with any step of the route other than the next step, including the particular juncture with the particular step (i.e., the current juncture that has the current step locator on it). When the process determines (at 1220) that the device has not entered in the circular range of the juncture, the process 1200 loops back to 1215 to determine whether the device has changed the direction of movement. When the process determines (at 1220) that the device has entered in the circular range of the juncture, the process 1200 proceeds to 1225 to display the sign for the step that corresponds to the juncture and to move the current step indicator to this juncture from the particular juncture. If the juncture that has the circular range that the device has just entered is the particular juncture (i.e., the current juncture), the process 1200 does not need to move the current step indictor. The process then ends.

When the process 1200 determines (at 1215) that the device is moving towards the juncture with the next step, the process 1200 displays (at 1230) the sign for the next step. Next, the process 1200 determines (at 1235) whether the device has entered the circular range of the juncture with the next step. When the process 1200 determines (at 1235) that the device has not entered the circular range of the juncture with the next step, the process loops back to 1215 to determine whether the device has changed the direction of the movement. When the process 1200 determines (at 1235) that the device has entered the circular range of the juncture with the next step, the process 1200 proceeds to 1240 to move the current step indicator to the juncture with the next step. The process 1200 then ends.

E. Inaccurate Location Information

Figure 13:
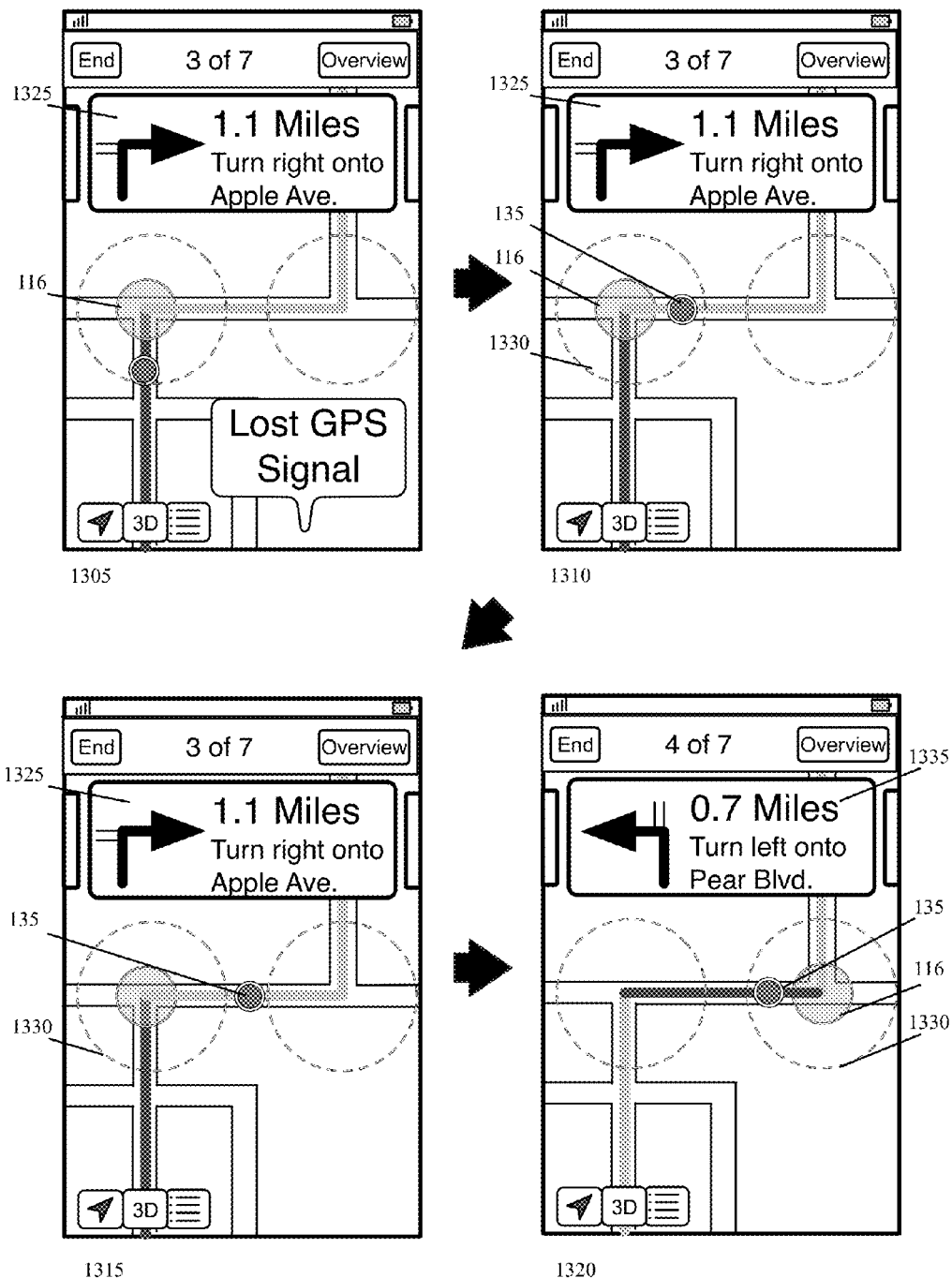
FIG. 13 illustrates an example operation of the mapping application operating in the automatic stepping mode on a device with a poor GPS signal reception.

FIG. 13 illustrates an example operation of the mapping application operating in the automatic stepping mode on a device with a poor GPS signal reception. When a user's device is in an area that provides a poor or no GPS signal, the mapping application may experience difficulty in determining the device's exact location as the user carrying the device moves to different locations on the map. The user's device may switch to other alternative technologies to determine the device's location on the map. For example, some embodiments may determine a user's location using radio, cellular network or Wi-Fi signals. These technologies may provide a lesser degree of accuracy and a larger margin of error regarding the device's location than information received from a standard GPS signal in some cases.

When utilizing these alternative technologies, the mapping application requires a greater degree of certainty that a user is actually at a particular location prior to providing any information to the user regarding the particular location. For instance, when the mapping application is operating in the automatic stepping mode, the mapping application will only display a particular sign associated with a step when the mapping application determines that a device's location is within a certain threshold distance, or a circular range, of the particular juncture associated with the step. As mentioned above, this circular range may vary depending on the particular transport mode (e.g. driving or walking), the type of technology being utilized to determine the user's location (e.g. radio, Wi-Fi, radar, etc.), the strength of the signal, the margin of error of the technology, and various other factors. In some embodiments, the circular range is hundreds of meters (e.g., 200 meters) when the mapping application is in the driving mode and tens of meters (e.g., 50 meters) when in the walking mode. The mapping application requires the greater degree of certainty because it is relying on technologies that provide a larger margin of error regarding the user's exact location on the map. Thus the mapping application only displays signs corresponding to a particular step when a user is within the circular range of the particular step.

FIG. 13 illustrates in four stages 1305-1320 that the mapping application of some embodiments operates in the automatic stepping mode and that the mapping application iterates through a series of steps as a user's device moves along a route when the device is receiving a poor GPS signal. The first stage 1305 illustrates the mapping application displaying a route on the user's device. The mapping application is displaying a sign 1325 with an instruction to "Turn right onto Apple Ave." in 1.1 miles. This is the third of seven steps for the particular route and the current step indicator 116 is located at the corresponding juncture for the third step.

The device also indicates that it has lost its GPS signal, illustrated by the "Lost GPS Signal" notification. This notification is provided only for illustrative purposes and is not actually displayed on the user's device in some embodiments. Once the user's device detects an insufficient GPS signal, it may rely on other alternative technologies to determine the user's location. As described above, these alternative technologies may provide information that has a larger margin of error regarding the exact location of the user when compared to information received from a strong GPS signal. Given the greater degree of uncertainty regarding the user's location, the mapping application only changes the signs in the automatic stepping mode when it has a sufficient level of certainty that the user's current location is near a particular step associated with a sign.

The second stage 1310 illustrates that the current location indicator 135 indicates that the user's current location is still within the circular range 1330 of the third step and thus the same sign 1325 for the third step, "Turn right onto Apple Ave." is displayed. Likewise, the mapping application still displays the current step indicator 116 on the juncture corresponding to the third step.

The third stage 1315 illustrates that the current location indicator 135 is now outside of the circular range 1330 of the third step. Since the user's device does not have a sufficient GPS signal, the mapping application does not change the sign 1325. Thus, the mapping application of some embodiments does not slide out the sign 1325 showing the instruction to turn right onto Apple Ave. even though the user's actual location maybe outside of the circular range 1330 of the juncture that has the third step. The mapping application does not slide out the sign 1325 because the information regarding the user's location is still below a particular threshold accuracy level.

The fourth stage 1320 illustrates the current location indicator 135 now indicates that the user's location is within the circular range 1335 of the juncture with the fourth step. Now that the user's location is within this narrower range of the next step, the mapping application displays the sign 1335 for the fourth step, "Turn left onto Pear Blvd." in 0.7 miles. The mapping application determines that it is now likely enough that the user is approaching the juncture with the fourth step since the user's location is within the circular range 1330 of the next step, even though the exact location information may have a larger margin of error than information typically received from a GPS signal. Likewise, the mapping application now displays the current step indicator 116 on the juncture corresponding to the fourth step.

Figure 14:
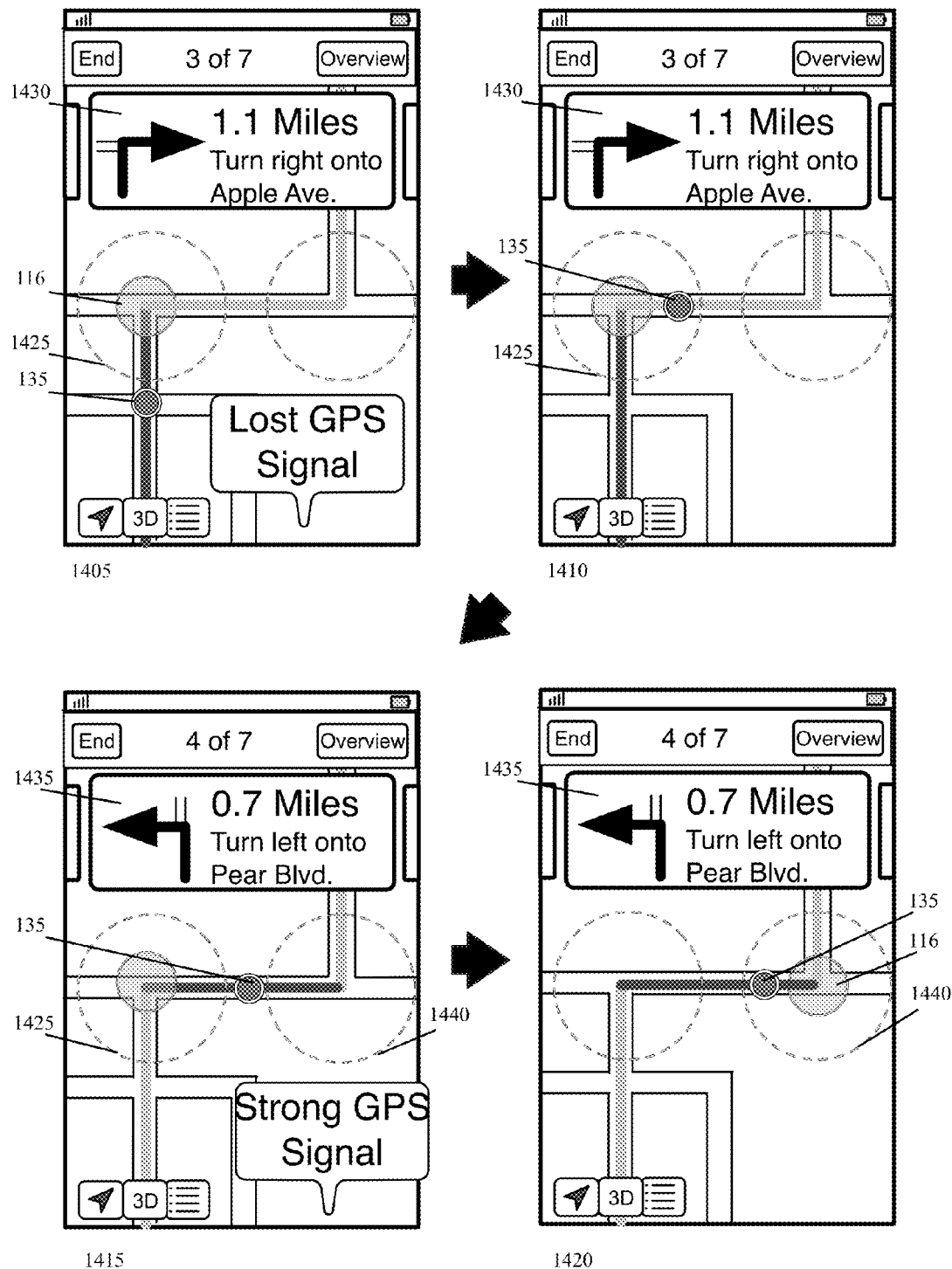
FIG. 14 conceptually illustrates the mapping application of some embodiments operating in the automatic stepping mode.

FIG. 14 conceptually illustrates in four stages 1405-1420 the mapping application of some embodiments operating in the automatic stepping mode that is iterating through a series of steps while re-gaining sufficient level of accuracy in determining the current location of the device. The first stage 1405 illustrates that the current location indicator 135 indicates that the user's current location is just outside of the circular range 1425 of the juncture with the third of seven steps on a particular route. The mapping application displays a sign 1430 with the instruction to "Turn right onto Apple Ave." in 1.1 miles. The device has also lost its GPS signal connection, as indicated by the "Lost GPS Signal" notification. As noted above, this notification is illustrated only for explanation purposes and is not actually displayed on the user's device when the device loses the GPS signal during actual use.

The second stage 1410 illustrates that the current location indicator 135 indicates that the user's current location is still within the circular range 1425 of the juncture with the third step, and thus the mapping application still displays sign 1430 with the instruction to turn right in 1.1 miles. The second stage 1415 illustrates that the current location indicator 135 is now outside of the circular range 1425 of the juncture with the third step. However, unlike stage 1315 in FIG. 13, the user's device is once again receiving a sufficient GPS signal as indicated by the "Strong GPS Signal" notification (provided for explanation purposes). Given the GPS data provides a greater degree of accuracy regarding the user's location, the mapping application reverts back to operating under normal conditions. As such, the mapping application displays the sign 1435 corresponding to the fourth step with the instruction to "Turn left onto Pear Blvd." in 0.7 miles, even though the user's location is outside of the circular range 1440 of the juncture with the fourth step. This is because the device has exited the circular range 1425 of the juncture with the third step and is moving towards the juncture with the fourth step.

The fourth stage 1420 illustrates the current location indicator 135 has moved within the circular range 1440 of the juncture with the fourth step. The mapping application is still displaying the sign 1435 corresponding to the fourth step with the instruction to "Turn left onto Pear Blvd." Furthermore, the mapping application now displays the current step indicator 116 on the juncture corresponding to the fourth step.

Figure 15:
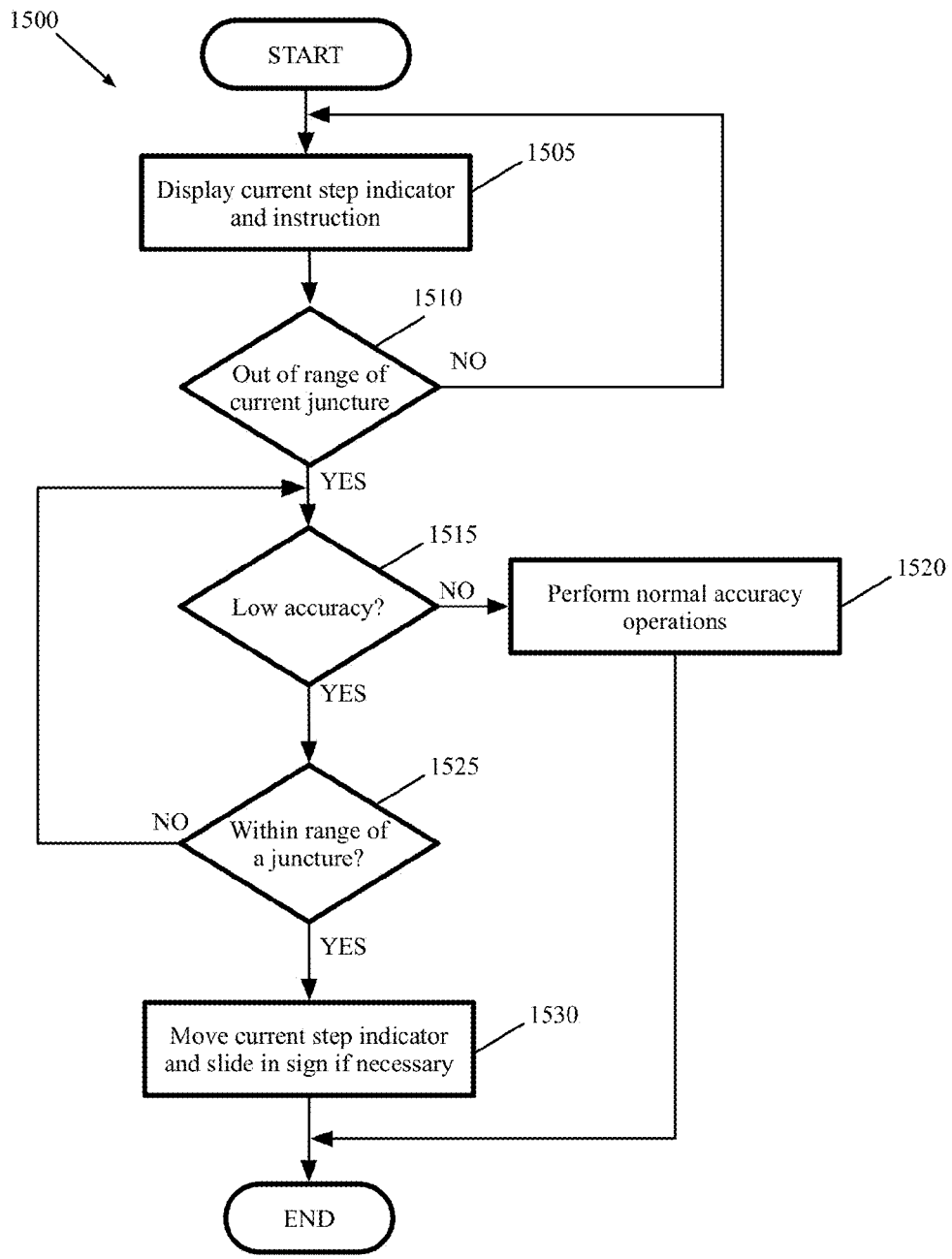
FIG. 15 conceptually illustrates a process that some embodiments perform to display the different steps taking into account the accuracy of the user's location information

FIG. 15 conceptually illustrates a process 1500 that some embodiments perform to display the different steps taking into account the accuracy of the user's location information (e.g., GPS signal). The process 1500 is performed by the mapping application of some embodiments that runs on the user's device. The process 1200 starts when the mapping application is operating in the automatic stepping mode. That is, the process 1200 is performed while the mapping application is tracking the current location of the device. In particular, the process 1200 starts when the device is within a particular circular range of a particular juncture for a particular step of the route.

The process 1500 begins by displaying (at 1505) a current step indicator at the particular juncture. Also at 1505, the process 1500 displays a particular sign for showing the particular step. The process then determines (at 1510) whether the device has moved out of the particular circular range of the particular juncture. When the process determines (at 1510) that the device has not moved out of the particular range, the process loops back to 1505 to keep displaying the particular sign and to keep the current step locator at the particular juncture.

When the process 1500 determines (at 1510) that the device has moved out of the particular range, the process 1500 determines (at 1515) whether the information received regarding the device's location is below a certain accuracy threshold. In some embodiments, the process 1500 examines the margin of error for a particular type of technology to determine whether it provides a sufficient level of accuracy regarding the user's location. This will vary depending on the particular source of the information and the particular technology being utilized by the user's device to determine the user's location. For instance, if the user's device is receiving a strong GPS signal, the mapping application knows that the information regarding the exact user's location is accurate to a certain margin of error.

When the user's device is using alternative technologies to determine a user's location, the mapping application analyzes the information it receives from these sources taking into consideration the level of accuracy these technologies provide regarding the user's location. If the mapping application determines that the information it receives regarding a user's location is not below a certain accuracy threshold, the process performs the normal automatic stepping mode operations.

This includes displaying an instruction for a subsequent step immediately after a user's current location is outside of the circular range of the juncture with the current step and the user is moving towards the juncture with the next step.

When the process 1500 determines (at 1515) that the accuracy of the user's location information is below the threshold (i.e., low accuracy), the process 1500 proceeds to 1525, which will be described further below. When the process 1500 determines (at 1515) that the accuracy of the user's location information is above the threshold, the process 1500 performs (at 1520) normal accuracy operations. That is, the process 1500 performs (at 1500) the operations that the processes (e.g., processes 400, 600, 900, 1200, etc.) of some embodiments described above perform. The process then ends.

When the process 1500 determines (at 1515) that the accuracy of the user's location information is below the threshold, the process 1500 determines (at 1525) whether the user's current location is within a circular range of the juncture corresponding to a step in the route. This juncture may be the particular juncture of which the device had exited the circular range. When the process 1500 determines (at 1525) that the user's current location is not within the range, the process loops back to 1515 to determine whether the accuracy of the information has been improved. The device may then satisfy this threshold accuracy condition if the device regains a sufficient signal connection. For example, the device may now be in an area that provides a strong GPS signal.

When the process 1500 determines (at 1525) that the user's current location has entered a circular range of a juncture, the process moves (at 1530) the current step indicator to this juncture and displays the sign for the step of this juncture. This would indicate that the user is within a close enough range of a juncture that, even with the larger margin of error of the alternative technology, the information still provides a sufficient level of certainty regarding the user's location with respect to the juncture. If this juncture is the particular juncture for which the process is displaying the particular sign and at which the process is keeping the current step indicator, the process does not have to slide out the particular sign and move the current step locator. The process then ends.

F. Switching Out of Automatic Stepping Mode

Figure 16:
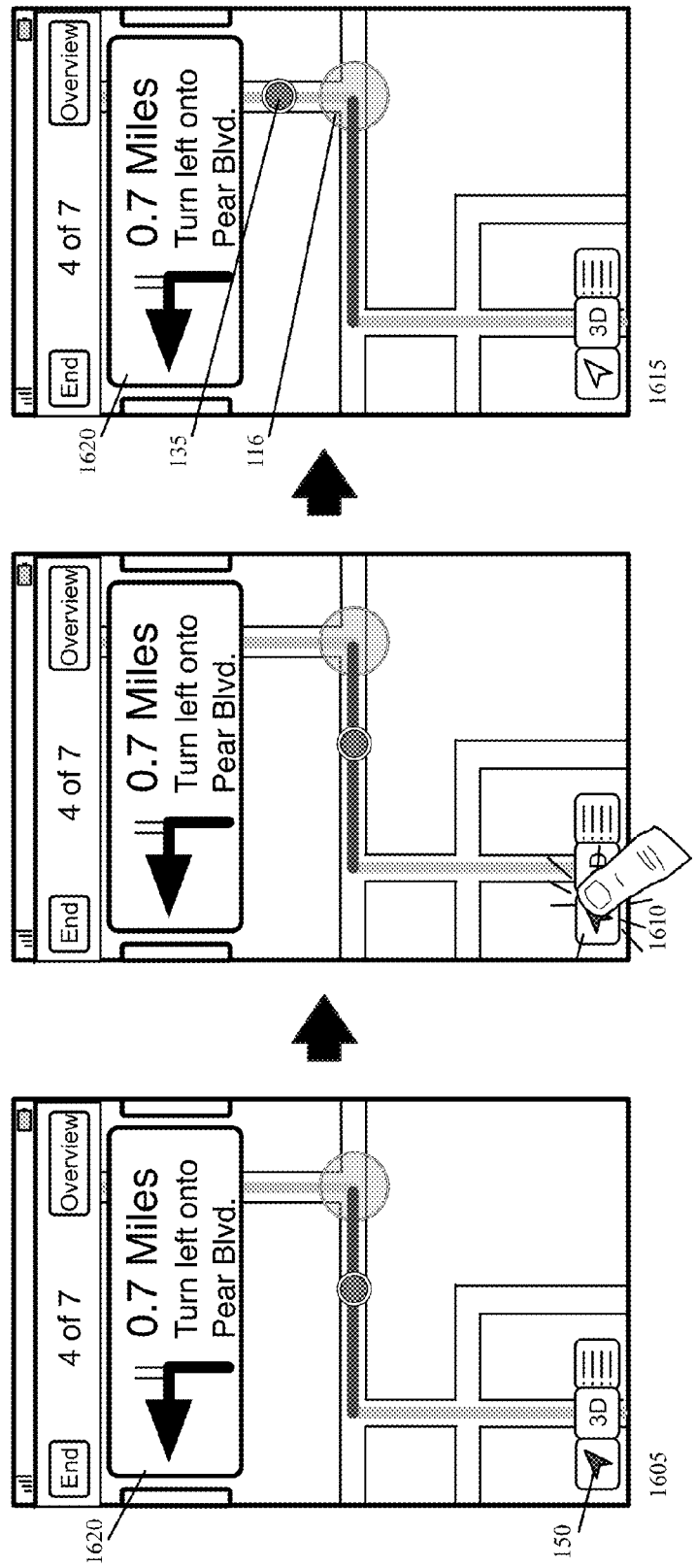
FIG. 16 illustrates a mapping application of some embodiments that switches out of the automatic stepping mode upon receiving a selection of the position control.

The user may at any time switch from the automatic stepping mode to the route inspection mode of the mapping application through several mechanisms. FIG. 16 illustrates in three stages 1605-1615 a mapping application of some embodiments that switches out of the automatic stepping mode upon receiving a selection of the position control 150.

The first stage 1605 illustrates the mapping application displaying a particular route in the automatic stepping mode. The user has previously enabled the tracking of the user's device, as illustrated by the highlighted position control 150. The mapping application is displaying a sign 1620 with the instruction to "Turn left onto Pear Blvd." in 0.7 miles. This sign 1620 corresponds to the fourth step of the seven steps of the particular route.

The second stage 1610 illustrates the user tapping the position control 150, which disables the tracking of the user's device and switches out of the automatic stepping mode and into the route inspection mode of the mapping application in some embodiments. In some embodiments, a single tap of the position control 1610 causes the mapping application to rotate the orientation of the map region to match the direction that the user is facing without exiting the automatic stepping mode, and another tap disables the automatic stepping mode. By switching out of the automatic stepping mode, the mapping application stops the automatic sliding of the signs based on the user's current location. Likewise, the mapping application no longer displays different regions of the map that correspond to the user's current location and the particular sign that is displayed does not automatically change even though the user has moved closer to the particular step in the series of steps for the route.

The third stage 1615 illustrates that the position control 150 has change the appearance in order to indicate that the tracking of the device's position is turned off and the mapping application is not operating in the automatic stepping mode.

Figure 17:
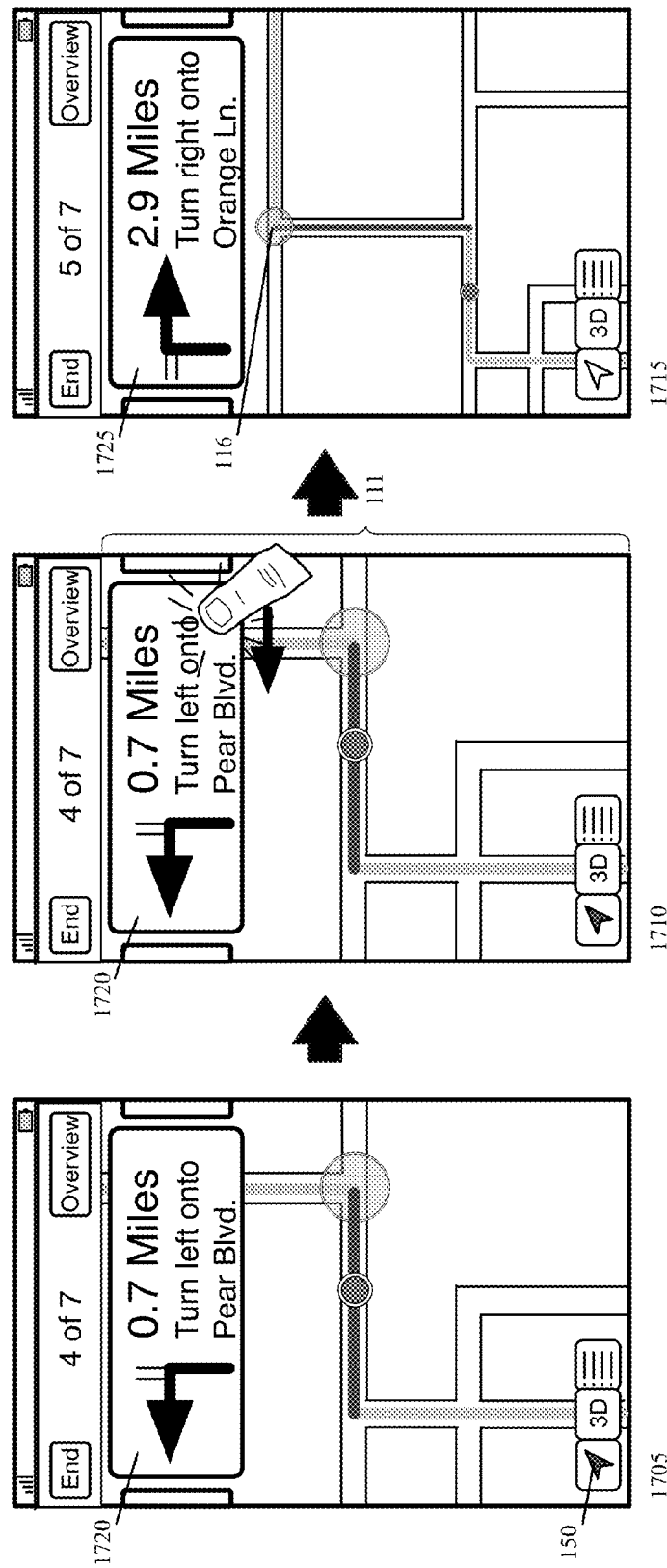
FIG. 17 illustrates a way of switching out of the automatic stepping mode.

FIG. 17 illustrates in three stages 1705-1715 another way of switching out of the automatic stepping mode. The first stage 1705, like stage 1605 of FIG. 16, illustrates a user's device on which the mapping application is operating in the automatic stepping mode. The mapping application is displaying a route along with a sign 1720 associated with a particular step of the route. The user has enabled the tracking of the user's device, as illustrated by the highlighted position control 150. The mapping application is displaying a sign 1720 with the instruction to "Turn left onto Pear Blvd." in 0.7 miles. This sign 1720 corresponds to the fourth step of the seven steps of the particular route.

The second stage 1710 illustrates the mapping application is sliding out the sign 1720 to the left of the UI page 111 upon receiving a user's input (e.g., tapping and/or swiping to the left) on the sign 1720. This input on the sign 1720 also causes the mapping application to switch out of the automatic stepping mode and into the route inspection mode. Since the user is no longer in the automatic stepping mode, the mapping application no longer tracks the movement of the user's location and stops the automatic iteration of the signs based on the user's location as the user moves along the route. Now that the user is in the route inspection mode, the user may manually swipe the signs to view the different steps associated with the particular route.

The third stage 1715 illustrates that the mapping application has slid in a sign 1725 for the fifth step of the particular route, which displays the instruction to "Turn right onto Orange Ln." in 2.9 miles. Likewise, the mapping application has shifted the map region displayed in the display area of the user's device to another region of the map that includes the juncture for the sign 1725. The mapping application has zoomed out to show the map region containing the particular juncture associated with the sign 1725. The mapping application has also moved the current step indicator 116 from the previous juncture to the new juncture corresponding to the sign 1725.

Figure 18:
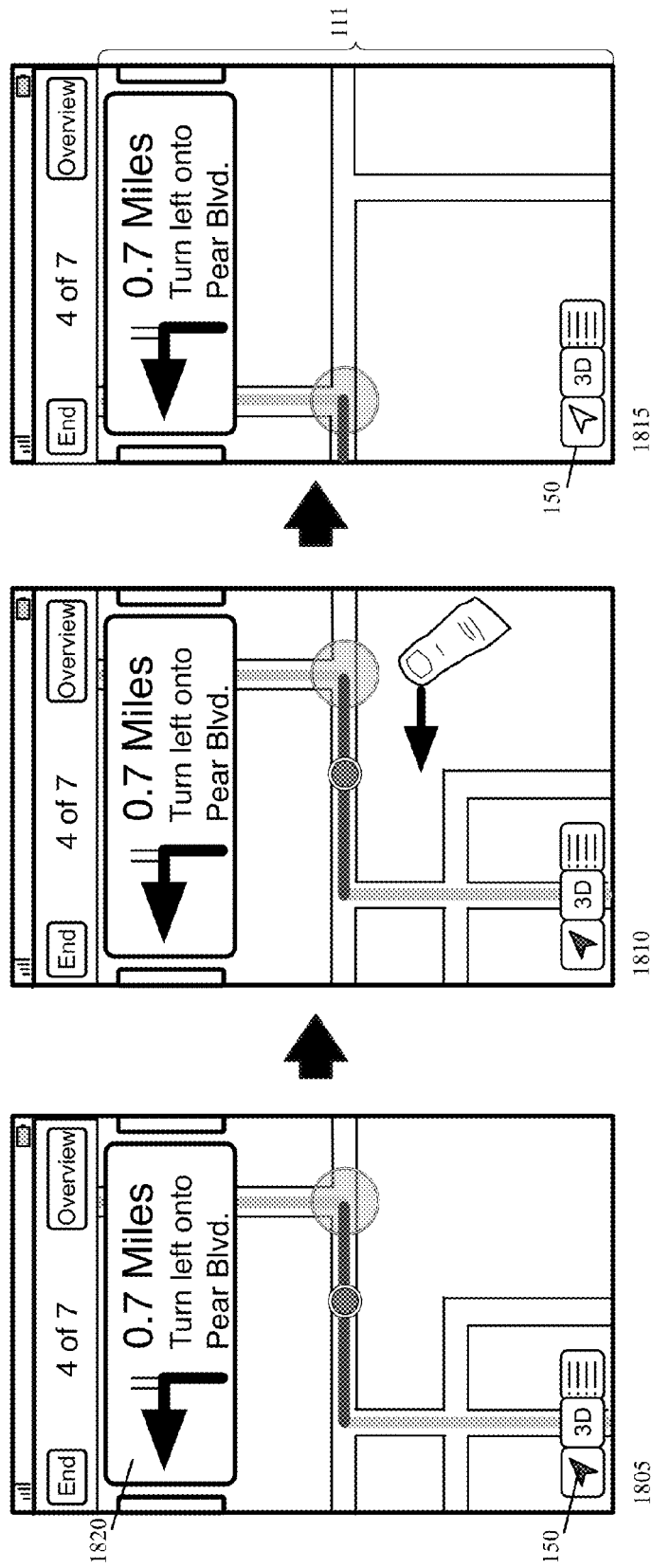
FIG. 18 illustrates a way of switching out of the automatic stepping mode.

FIG. 18 illustrates in three stages 1805-1815 yet another way of switching out of the automatic stepping mode. The first stage 1805, like stage 1605 of FIG. 16, illustrates user's device on which the mapping application is operating in the automatic stepping mode. The mapping application is displaying a route along with a sign 1820 corresponding to a particular step of the route. The user has enabled the tracking of the user's device, as illustrated by the highlighted position control 150. The mapping application is displaying a sign 1820 with the instruction to "Turn left onto Pear Blvd." in 0.7 miles. This sign 1820 corresponds to the fourth step of the seven steps of the particular route.

The second stage 1810 illustrates that the mapping application is receiving the user input (e.g., gesture input such as tapping or swiping) on the map region in the UI page. This causes the mapping application to switch out of the automatic stepping mode and into the route inspection mode in some embodiments. The mapping application also stops tracking the user's device and ends the automatic sliding of the signs as the user navigates through the route.

The third stage 1810 also illustrates that the mapping application is displaying another map region upon receiving the user input in the previous stage 1805. The mapping application has shifted the previously displayed map region to the left of the UI page 111. The third stage 1815 also illustrates that the position control 150 is no longer highlighted.

In some embodiments, the mapping application automatically stops tracking the user's progress on a route when the user moves outside of a certain threshold distance of the route. In some embodiments, the threshold distance is set to ten percent of the total length of the route. For instance, if the length of the route between two locations is 100 miles, the mapping application stops tracking the user's progress on the route once a user's current location is more than 10 miles from the nearest juncture with a step on the route. In some embodiments, the threshold is computed based on a straight-line distance between the two locations, and not the actual driving distance. This threshold distance may be different in other embodiments.

Figure 19:
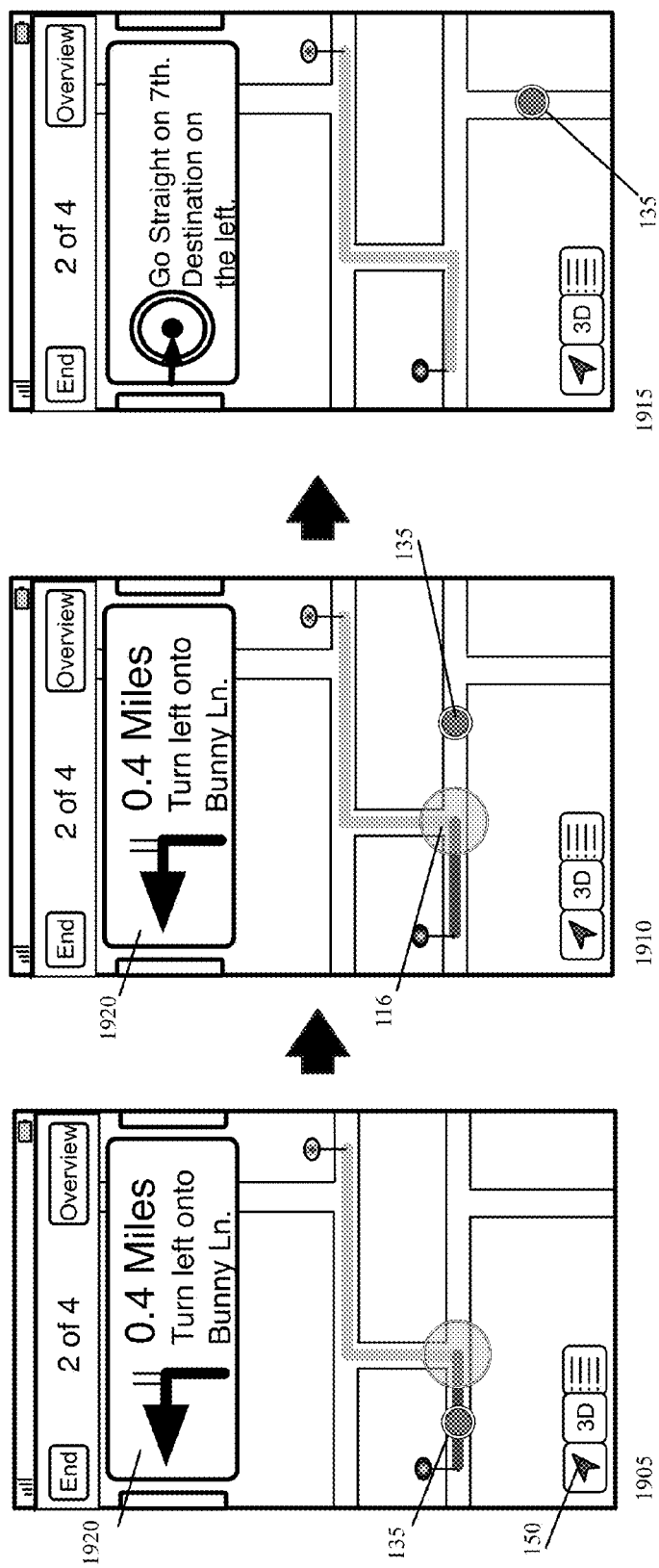
FIG. 19 illustrates a user moving outside of a route causing the mapping application to switch out of the automatic stepping mode.

FIG. 19 illustrates in three stages 1905-1915 a user moving outside of a route causing the mapping application to stop tracking the progress of the user along the route. The stage 1905 illustrates the mapping application displaying a particular route between two locations. The user has enabled tracking of their device as indicated by the highlighted position control 150 icon, which causes the mapping application to operate in the automatic stepping mode. The current location indicator 135 indicates that the user's current location is moving towards the second of four steps. The mapping application is displaying a sign 1920 with the instruction to "Turn left onto Bunny Ln." in 0.4 miles.

The second stage 1910 illustrates that the current location indicator 135 has moved past the current step indicator 116 for the juncture corresponding to the second step and the user's location and movement is no longer along the route. Although the user is not moving along the route, the mapping application is still tracking the progress of the user as though the user is moving along the route and displays the sign 1920 corresponding to the second step. The mapping application is also displaying the current step indicator 116 on the juncture corresponding to the second step. For this particular location of the current position identifier 135, the mapping application has determined that the user's current location is not outside of a particular threshold distance of the route and thus the mapping still tracks the user's progress as though the user is moving along the route. This may occur, for example, if the user's current location is still within 10% of the total distance of the route between the two locations.

The third stage 1915 illustrates that the mapping application has now stopped tracking the progress of the user along the route. The mapping application of some embodiments no longer displays a sign or the current step indicator on the map and does not highlight the particular segment on the route corresponding to the current step. The current location indicator 135 indicates that the user's current location is further away from the route than in stage 1910. In particular, the mapping application has determined that the user's distance from the nearest location along the route is beyond 10% of the total distance of the route, and thus has stopped tracking the user's progress on the route. In some embodiments, the mapping application switches back to tracking the user's progress along the route when the current location indicator 135 moves back within the particular threshold distance of the route. When the mapping application stops tracking the user's progress along the route, the mapping application displays the sign that corresponds to the juncture with a step that is closest to the user's current location. Stage 1915 illustrates the mapping application displaying the sign for the destination along the route. The mapping application displays this sign because the user's current location is closest in distance to this particular juncture with a step along the route.

G. Centering Current Location Indicator

For illustrative purposes, all of the figures described above did not illustrate certain aspects of the actual mapping application's displaying behavior on a user's device. In particular, the mapping application keeps the current location indicator 135 centered within the display area (e.g., the UI page 111) at all times during the automatic stepping mode when tracking a user's movement across a map. In order to keep the current location indicator 135 centered, the mapping application shifts the map region surrounding the current location indicator 135 in the map display area. For explanation purposes, the figures above illustrate that the current location indicator as moving to different areas of a particular map region. For example, in order to accurately describe the relationship between the current location indicator 135 and the various circular ranges associated with various steps of a route, the figures above have been described without using the actual display of the mapping application of some embodiments on a user's device. Furthermore, the mapping application changes the orientation of the map region to match the user's device when the user enables this feature (e.g., by tapping the position control 150 a second time after enabling the tracking).

Figure 20:
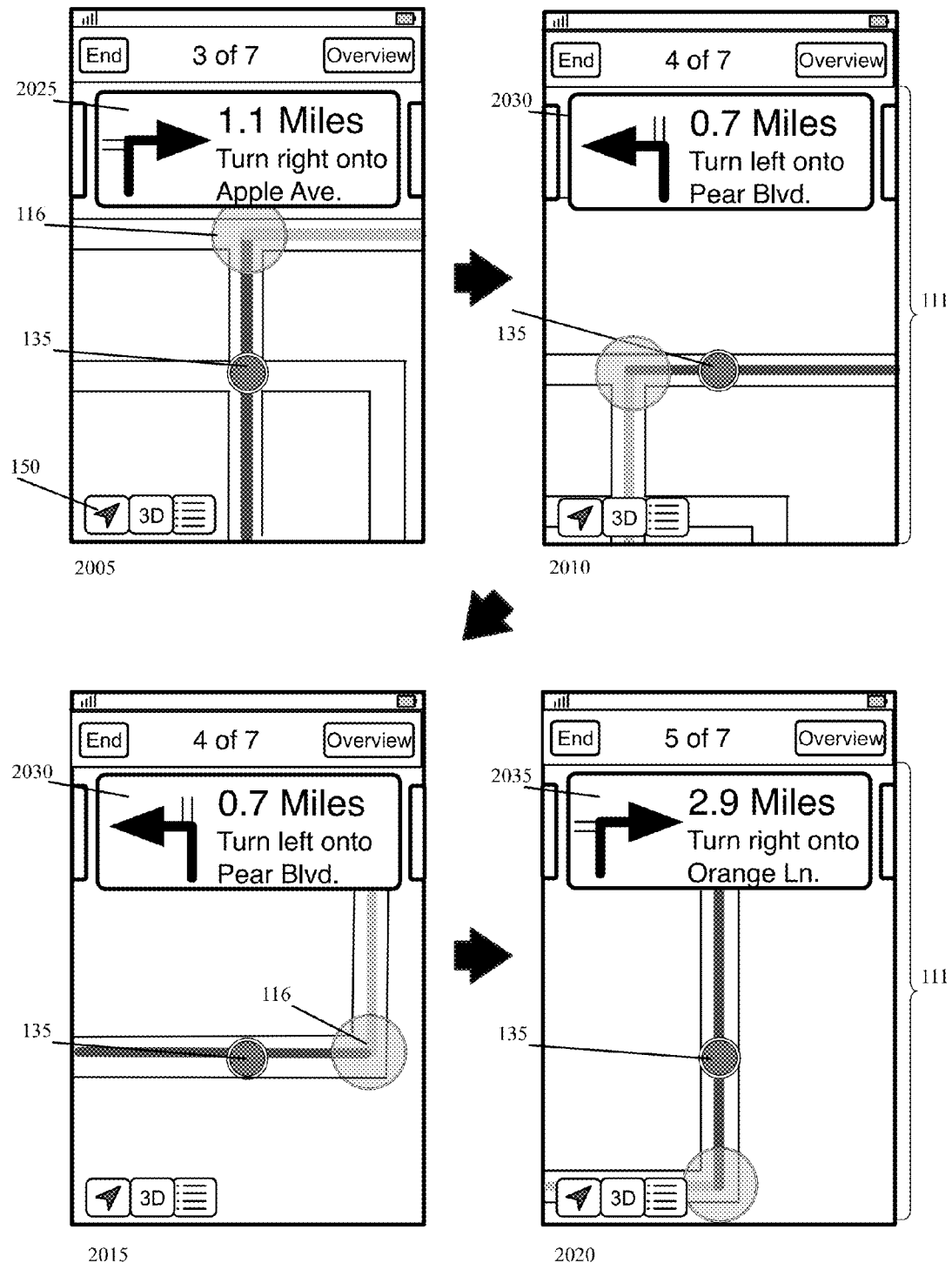
FIG. 20 illustrates the actual display that a user sees on their device in some embodiments.

FIG. 20 illustrates in four stages 2105-1920 the actual display that a user sees on their device for the same series of stages 505-520 illustrated in FIG. 5. In particular, stages 2005-1920 illustrate the mapping application displaying the current location indicator 135 while keeping it centered at all times as the user moves along a route displayed on the map. The stage 2005 illustrates the UI page 111 for the corresponding stage 505 of FIG. 5. The user's device is currently running the mapping application. The mapping application is in the automatic stepping mode for a particular route. The position control 150 is highlighted to indicate that mapping application is tracking the user's device (e.g. the user may have tapped the position control 150 one time to enable tracking). The user is currently moving towards the third of seven steps of the route. The mapping application is displaying the sign 2025 corresponding to the third step with the instruction to "Turn right onto Apple Ave." in 1.1 miles. The current step indicator 116 is also displayed at the juncture associated with third step.

The second stage 2010 illustrates the region of the map that is displayed in the UI page 111 for the corresponding stage 510 of FIG. 5. The current location indicator 135 is now past the juncture with the third step and is moving towards the juncture with the fourth step. The mapping application is displaying the sign 2030 for the fourth step with the instruction to "Turn left onto Pear Blvd." in 0.7 miles. The display area keeps the current location indicator 135 centered within the display area.

The third stage 2115 illustrates that the current location indicator 135 is now almost at the juncture corresponding to the fourth step. The UI page 111 displays the current step indicator 116 at the juncture with the fourth step that corresponds to the sign 2030. The fourth stage 2020 illustrates that the user has executed the left turn onto Pear Blvd. and is now moving towards the juncture with the fifth step (not shown). The display area now displays the sign 2035 with the fifth step, which reads "Turn right onto Orange Ln." in 2.9 miles. Likewise the current location indicator 135 has remained fixed at the center of the display area.

FIG. 21 illustrates in four stages 2105-1920 the actual display that a user sees on their device, with the particular display being re-oriented to match the direction that the user is facing as the user travels along a route, for the same series of stages 505-520 illustrated in FIG. 5. In particular, stages 2105-1920 illustrate the mapping application displaying the current location indicator 135 while keeping it centered and matching the direction that the user is facing at all times as the user moves along a route displayed on the map.

The first stage 2105 illustrates the UI page 111 for the corresponding stage 505 of FIG. 5. The user's device is currently running the mapping application. The mapping application is in the automatic stepping mode for a particular route. The position control 150 indicates that mapping application is tracking the user's device as well as the particular direction that the user is facing. In some embodiments, the position control 150 indicator icon changes, as illustrated in stage 2105-2120, to show that the user's particular orientation (e.g., the direction the user is facing similar to a compass) is being tracked in addition to their location. The mapping application rotates and re-orients the map region to match the particular direction that the user is facing when the position control icon 150 is tapped two times in some embodiments (e.g., once for turning tracking on, and a second time to track and rotate the map according to the direction the user is heading). The user is currently moving towards the third of seven steps of the route. The mapping application is displaying the sign 2125 corresponding to the third step with the instruction to "Turn right onto Apple Ave." in 1.1 miles. The current step indicator 116 is also displayed at the juncture associated with third step.

The second stage 2110 illustrates the region of the map that is displayed in the UI page 111 for the corresponding stage 510 of FIG. 5. The current location indicator 135 is now past the juncture with the third step and is moving towards the juncture with the fourth step. The mapping application is displaying the sign 2130 for the fourth step with the instruction to "Turn left onto Pear Blvd." in 0.7 miles. The display area keeps the current location indicator 135 centered within the display area and the mapping application has rotated the orientation of the map region, in this case by 90 degrees to the right, such that the segment of the route associated with the current location indicator 135 is displayed to match the direction that the user's device is facing.

The third stage 2115 illustrates that the current location indicator 135 is now almost at the juncture corresponding to the fourth step. The UI page 111 displays the current step indicator 116 at the juncture with the fourth step that corresponds to the sign 2130. The fourth stage 2120 illustrates that the user has executed the left turn onto Pear Blvd. and is now moving towards the juncture with the fifth step (not shown). The display area now displays the sign 2135 with the fifth step, which reads "Turn right onto Orange Ln." in 2.9 miles. The mapping application has again rotated the orientation of the map region to display the new segment of the route vertically within the display area, which matches the direction that the user device is facing or being held by the user at that time. Likewise the current location indicator 135 has remained fixed at the center of the display area.

H. 3D Map

Figure 22:
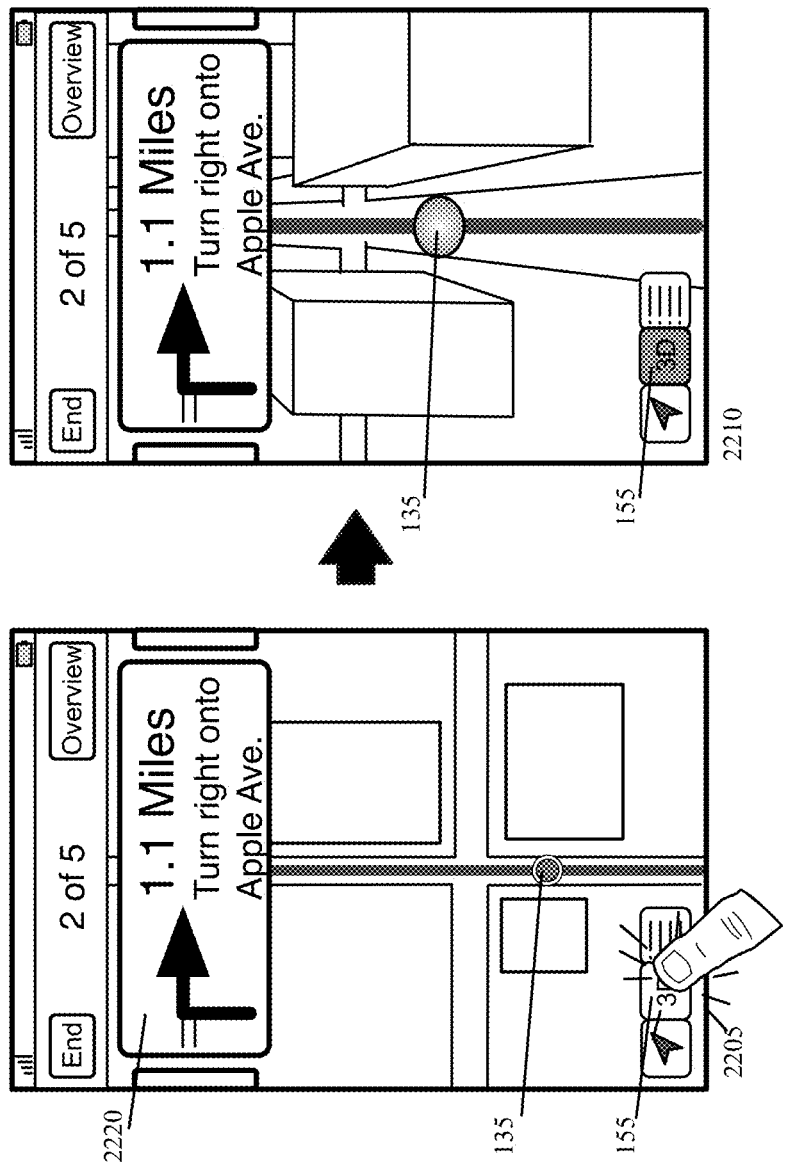
FIG. 22 illustrates that the mapping application displays 3D map upon receiving a user input.

The mapping application allows a user to view the map in 3D mode. FIG. 22 illustrates in two stages 2205-2210 that the mapping application displays a 3D map upon receiving a user input. The first stage 2205 illustrates the mapping application displaying a particular route on a map. The mapping application is also in the automatic stepping mode and thus the sign 2220 corresponding to the particular step of the route is also displayed in the display area. The current location indicator 135 indicates that the user is currently moving towards the second of five steps, with the sign 2220 displaying the instruction to "Turn right onto Apple Ave." in 1.1 miles. The user is also selecting (e.g., by tapping) the 3D control 155.

The second stage 2210 illustrates the mapping application now displays the map region in 3D. The 3D control 155 has changed appearance (e.g., highlighted) to indicate that the map is now in the 3D mode. Likewise, the current location indicator 135 shows the user's current location within several building on the three-dimensional map. In some embodiments, the user has to option to switch to the 3D map view only when the 3D data is available.

II. Multi-Mode Mapping Application

Figure 23A:
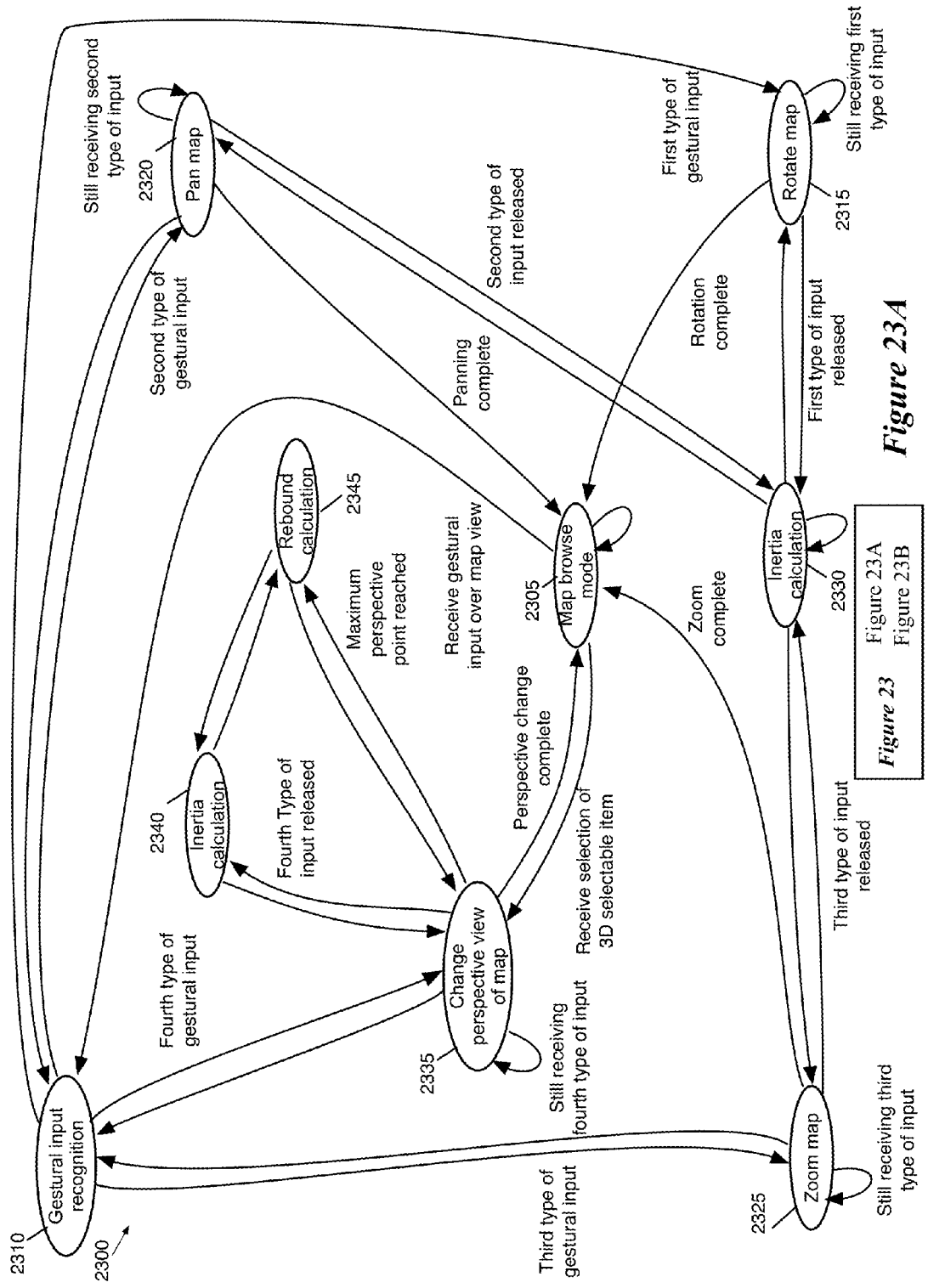
FIGS. 23A-23B conceptually illustrate a state diagram that describes different states and transitions between these states of the integrated mapping, search, and navigation application of some embodiments.
Figure 23B:
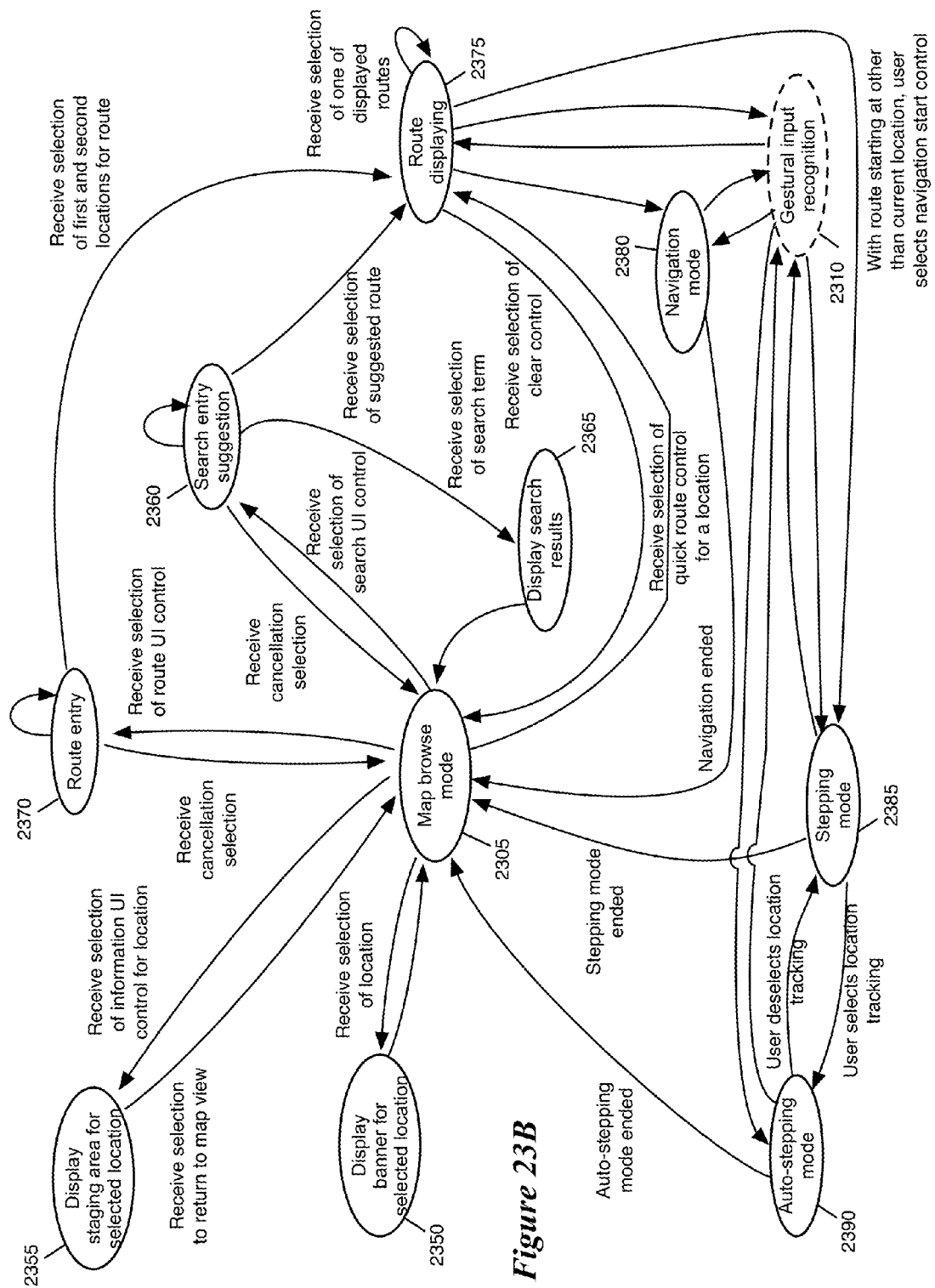

FIGS. 23A-23B conceptually illustrate a state diagram 2300 that describes different states and transitions between these states of the integrated mapping, search, and navigation application of some embodiments (e.g., the application described in the above sections). One of ordinary skill in the art will recognize that the application of some embodiments will have many different states relating to all different types of input events, and that the state diagram 2300 is specifically focused on a subset of these events. The state diagram 2300 describes and refers to various gestural interactions (e.g., multi-touch gestures) for changing states of the application. One of ordinary skill in the art will recognize that various other interactions, such as cursor controller gestures and button clicks, keyboard input, touchpad/trackpad input, etc. may also be used for similar selection operations.

When a user initially opens the mapping application, the application is in state 2305, the map browsing state. In this state 2305, the application will have generated and displayed a map view. To generate and display this map view, the application of some embodiments identifies a required set of map tiles for a region, requests the map tiles (e.g., from a mapping service server), generates a view of the map tiles from a particular location, orientation, and perspective of a virtual camera, and renders the map view to a device display. When in state 2305, the map view is static. With the application in state 2305, the user can perform numerous operations to modify the map view, search for entities (e.g., places of interest, addresses, etc.), retrieve a route for navigation, etc.

In some embodiments, the integrated application is displayed on a device with an integrated touch-sensitive display. Various gestural interactions over the map may cause the application to perform different modifications to the map view (e.g., panning, rotating, zooming, modifying the map perspective, etc.). When the integrated application receives gestural interaction over the map display (as opposed to touch inputs over various floating or non-floating controls overlaid on the map display), the application transitions to state 2310 to perform gestural input recognition.

The gestural input recognition state 2310 differentiates between different types of gestural input and translates these types of input into different map view modification operations. In some embodiments, the mapping application receives the gestural input as translated by the operating system of the device with the integrated touch-sensitive display. The operating system translates the touch input into gesture types and locations (e.g., a "tap" at coordinates (x,y), a "pinch" operation with separate touch inputs at two different locations, etc.). At state 2310, the integrated mapping application of some embodiments translates these into the different map view modification operations.

When the application receives a first type of gestural input (e.g., two separate touch inputs moving together in a rotational motion over the map view), the application transitions to state 2315 to rotate the map. To rotate the map view, some embodiments modify the location and/or orientation of the virtual camera that determines which portion of the map is rendered to create the map view. When in 3D mode, for example, the mapping application rotates the virtual camera about a particular position (e.g., the center of the touch inputs, the center of the display, a location indicator identifying the user's location, etc.). As the first type of gestural input continues, the mapping application remains in state 2315 to continue rotating the map.

When the user releases the first type of gestural input, the application of some embodiments transitions to state 2330 to perform an inertia calculation. In some embodiments, after the user releases certain types of touch inputs, the application continues to perform the associated map view modification for a particular amount of time and/or distance. In this case, after the user releases the rotation input, the application transitions to the inertia calculation state 2330 to calculate the additional rotation amount and the time over which this rotation should be performed. In some embodiments, the application slows down the rotation from the (angular) velocity at which the map was being rotated, as if a "frictional" force was applied to the map. As such, the inertia calculation of some embodiments is based on the speed of the first type of gestural input. From state 2330, the application transitions back to the map modification state that the application was previously in. That is, when the application transitions from state 2315 (the rotation state) to the inertia calculation state 2330, it then transitions back to state 2315 after performing the inertia calculation. After the rotation of the map is complete, the application transitions back to state 2305.

When the application receives a second type of gestural input (e.g., a single touch input moving over the map view), the application transitions to state 2320 to pan the map. To pan the map view, some embodiments modify the location of the virtual camera that determines which portion of the map is rendered to create the map view. This causes the map to appear to slide in a direction derived from the direction of the second type of gestural input. In some embodiments, when the map view is in a 3D perspective mode, the panning process involves performing a correlation of the location of the touch input to a location on the flat map, in order to avoid sudden unwanted jumps in the map view. As the second type of gestural input continues, the mapping application remains in state 2320 to continue panning the map.

When the user releases the second type of gestural input, the application of some embodiments transitions to state 2330 to perform an inertia calculation. In some embodiments, after the user releases certain types of touch inputs, the application continues to perform the associated map view modification for a particular amount of time and/or distance. In this case, after the user releases the panning input, the application transitions to the inertia calculation state 2330 to calculate the additional amount to move the map view (i.e., move the virtual camera) and the time over which this movement should be performed. In some embodiments, the application slows down the panning movement from the velocity at which the map was being panned, as if a "frictional" force was applied to the map. As such, the inertia calculation of some embodiments is based on the speed of the second type of gestural input. From state 2330, the application transitions back to the map modification state that the application was previously in. That is, when the application transitions from state 2320 (the panning state) to the inertia calculation state 2330, it then transitions back to state 2320 after performing the inertia calculation. After the panning of the map is complete, the application transitions back to state 2305.

When the application receives a third type of gestural input (e.g., two separate touch inputs moving closer together or further apart), the application transitions to state 2325 to zoom in or out on the map. To change the zoom level of the map view, some embodiments modify the location (i.e., height) of the virtual camera that determines which portion of the map is rendered to create the map view. This causes the map view to include more (if zooming out) or less (if zooming in) of the map. In some embodiments, as the user zooms in or out, the application retrieves different map tiles (for different zoom levels) to generate and render the new map view. As the third type of gestural input continues, the mapping application remains in state 2325 to continue panning the map.

When the user releases the second type of gestural input, the application of some embodiments transitions to state 2330 to perform an inertia calculation. In some embodiments, after the user releases certain types of touch inputs, the application continues to perform the associated map view modification for a particular amount of time and/or distance (i.e., moving the virtual camera higher or lower). In this case, after the user releases the zoom input, the application transitions to the inertia calculation state 2330 to calculate the additional amount to zoom the map view (i.e., move the virtual camera) and the time over which this movement should be performed. In some embodiments, the application slows down the zooming movement from the velocity at which the map was being zoomed in or out of (i.e., the speed at which the virtual camera changes height), as if a "frictional" force was applied to the camera. As such, the inertia calculation of some embodiments is based on the speed of the third type of gestural input. From state 2330, the application transitions back to the map modification state that the application was previously in. That is, when the application transitions from state 2325 (the zooming state) to the inertia calculation state 2330, it then transitions back to state 2325 after performing the inertia calculation. After the zooming of the map is complete, the application transitions back to state 2305.

For simplicity, the state diagram 2300 illustrates the map panning, zooming, and rotation processes using the same inertia calculation process (state 2330). However, in some embodiments, each of these different map modification processes actually uses a different inertia calculation to identify the slow-down and stop for its particular type of movement. In addition, some embodiments calculate and modify the inertia variables as the input is received rather than when the user removes the gestural input.

When the application receives a fourth type of gestural input (e.g., two separate touch inputs moving up or down the touch-sensitive display in unison), the application transitions to state 2335 to modify the perspective view of the map. To change the perspective view of the map, some embodiments move the virtual camera along an arc over the map, modifying both the location and orientation of the virtual camera (as the camera keeps the center of its field of view at a particular location on the map). In some embodiments, different zoom levels use different arcs along which the virtual camera moves. Each of these arcs has a top point at which the virtual camera is pointing straight down, giving a 2D perspective view of the map. In addition, each arc has a bottom point, that is the lowest point on the arc to which the virtual camera can be moved. Thus, the fourth type of gestural input can cause the application to change between a 2D map view and a 3D perspective map view in some embodiments. As the fourth type of gestural input continues, the mapping application remains in state 2335 to continue modifying the perspective view of the map.

When the user releases the second type of gestural input, the application of some embodiments transitions to state 2340 to perform an inertia calculation. In some embodiments, after the user releases certain types of touch inputs, the application continues to perform the associated map view modification for a particular amount of time and/or distance (i.e., moving the virtual camera higher or lower). In this case, after the user releases the perspective view change input, the application transitions to the inertia calculation state 2340 to calculate the additional amount to modify the perspective of the map view (i.e., move the virtual camera along its arc) and the time over which this movement should be performed. In some embodiments, the application slows down the movement from the velocity at which the map was changing perspective (i.e., the speed at which the virtual camera moves along its arc), as if a "frictional" force was applied to the camera. As such, the inertia calculation of some embodiments is based on the speed with which the fourth type of gestural input was performed.

In addition, for the perspective change operation, some embodiments transition to a rebound calculation state 2345. As stated, the perspective change operation has a maximum and minimum perspective shift allowed in some embodiments, which may depend on the zoom level of the current map view. Thus, in addition to an inertia calculation, the application performs a rebound calculation at state 2345. The rebound calculation uses the inertia calculation to determine whether the maximum point along the virtual camera arc will be reached and, if so, the velocity of the virtual camera at this point. Some embodiments allow the virtual camera to move slightly past the maximum point to hit a "rebound" point, at which point the application turns the virtual camera around on its arc, moving it back towards the maximum point. Some embodiments include such a bounce-back functionality only on one end of the virtual camera arc (e.g., the bottom of the arc), while other embodiments include the functionality on both ends of the arc. From the rebound calculation state 2345, the application transitions back to the inertia calculation state 2340, then back to the perspective changing state 2335 to display the map view movement. In addition, when the user performs the fourth type of touch input for long enough and the perspective reaches its maximum point, the application transitions directly from the state 2335 to state 2345 to calculate the rebound information and then transitions back to state 2335. After the modification to the perspective view of the map is complete, the application transitions back to state 2305.

The above states relate to the various multi-touch gestures over the map presentation that the integrated mapping, search, and navigation application translates into different modifications to the map presentation. Various other touch inputs can also cause the application to change states and perform various functions. For instance, some embodiments overlay a 3D selectable item on the map view (e.g., as a floating control), and selecting (e.g., with a tap input) the 3D item causes the application to transition to 2335 to modify the perspective of the map view. When the map view starts in a 3D perspective view, the application modifies the perspective into a 2D view; when the map view starts in the 2D view, the application modifies the perspective into a 3D view. After the modification, the application returns to state 2305.

When a user is viewing a map in state 2305, the application presents various labels as part of the map view. Some of these labels indicate places of interest, or other locations. When a user selects certain labels (e.g., for certain businesses, parks, etc.), the application transitions to state 2350 to display a banner for the selected location (e.g., an information display banner), then returns to the map browsing state (with the banner displayed over the map). In some embodiments, this banner includes (1) a quick-route navigation UI control (e.g., a button) that causes the application to retrieve a route (e.g., a driving route) from a current location of the device to the selected location without leaving the map view and (2) an information UI control (e.g., button) that causes the application to provide additional information about the location.

When a user selects the UI control button, the application transitions from state 2305 to state 2355 to display a staging area for the selected location. In some embodiments, this staging area displays a media presentation of the selected location (e.g., a 3D video presentation, a flyover view of the selected location, a series of images captured for the location, etc.), as well as various information for the selected location (contact information, reviews, etc.). The application stays in the state 2355 as the user performs various operations to navigate the staging area and view information within the staging area. When a user selects a UI control to transfer back to the map view, the application transitions to state 2305.

From the map browsing view, the user can also easily access the search function of the application. When a particular UI control (e.g., a search bar) is selected, the application transitions to a search entry suggestion state 2360. At the search entry state, some embodiments display a touchscreen keyboard with which the user can enter a search term. The search term may be a business name, an address, a type of location (e.g., coffee shops), etc. While the user enters characters, the application remains in state 2360 and provides suggestions based on recent searches, the letters already entered, etc. Some embodiments may use prefix-based suggestions (e.g., suggestions starting with the characters already entered) as well as other suggestions (e.g., making spelling corrections to add characters at the beginning of the already-entered string, transpose characters, etc.). In some embodiments, the selections may also include recently entered routes in addition to locations. If the user selects a cancellation UI control at this stage, the application transfers back to state 2305 without performing a search.

When the user selects a search term (either a suggested term or that entered completely by the user), the application transitions to state 2365 to display the search results over the map view, then transitions to state 2305 with the search results displayed. Some embodiments display the search results as selectable items (e.g., pins) on the map; selection of one of the items causes a transition to state 2350 to display the banner for the selected item. In addition, the application of some embodiments automatically selects one of the search results (e.g., a "best" result) and displays this banner as part of the state 2365.

As the application is a tightly integrated mapping, search, routing, and navigation application, the user can easily access the routing function from the map browsing state. When a particular UI control (e.g., a route entry button) is selected, the application transitions to the route entry state 2370. At the route entry state, some embodiments display a touchscreen keyboard with which the user can enter locations (e.g., addresses, place names, place types, etc.) into both "to" and "from" fields in order to request a route. While the user enters characters, the application remains in state 2370 and provides suggestions based on recent routes, recent searches, an autocomplete similar to that described for the search entry, etc. If the user selects a cancellation UI control at this stage, the application transfers back to state 2305 without retrieving a route.

When the user selects a route (e.g., by entering a "to" location and a "from" location), the application transitions to the route displaying state 2375. At this state, the application displays one or more routes from a first selected location to a second selected location over the map view (e.g., by overlaying route lines on the map view). Some embodiments automatically select a first one of the routes. The user can select any of the other routes (e.g., by tapping over the unselected route), with the application remaining in state 2375 (but modifying the display of the route lines to indicate the selection of the other route). In addition, when in state 2375, the application of some embodiments displays different UI controls related to routing and navigation, including a direction list control, a navigation start control, and others.

Also, various gestural interactions over the map on which the routes are displayed may cause the application to perform different modifications to the map view (e.g., panning, rotating, zooming, modifying the map perspective, etc.). When the integrated application receives gestural interaction over the map display while in the route display state 2375, the application transitions to state 2310 to perform gestural input recognition, with all of the gestural map modification operations (e.g., corollaries to states 2315-2345) available. That is, the application translates the gestural input into panning, rotation, zoom, and/or perspective change operations similar to those described above for states 2315-2345, with similar inertia and rebound features for the virtual camera movement. Whereas the operations 2315-2345 return to the map browsing state 2305, the corollary operations accessed from the route display state 2375 return to the route display state 2375.

In some embodiments, the route display state 2375 is accessible from other states as well. For instance, if a user selects the quick-route UI control on a banner while in state 2305, the application retrieves one or more routes from the current location of the device to the location with which the banner is associated. In addition, some embodiments display previously requested routes among the search suggestions at state 2360. When the user selects one of these suggested routes, the application transitions directly from state 2360 to state 2375 to display one or more routes over the map.

From the route display state 2375, the application can transition into various different modes depending on different controls selected by the user. When the user selects a UI control to clear the routes, the application transitions back to state 2305 to display the map without any routes. In addition, the integrated application may enter one or more navigation modalities from the route displaying state 2375.

When the selected route displayed at state 2375 starts at the current location of the device and the user selects a navigation starting control, the application transitions to the navigation state 2380. In some embodiments, the application displays a cinematic transition from the map view into a more immersive 3D view for navigation. Within the navigation state 2380 of some embodiments, a virtual camera follows the location of the user along the selected route in order to present the upcoming portions of the route. When either the route is completed (the device reaches the destination location) or the user selects a control to end navigation, the application transitions to state 2305 to present the map browsing view 2305.

In some embodiments, various gestural interactions over the map on which the routes are displayed may cause the application to perform different modifications to the map view (e.g., panning, rotating, zooming, modifying the map perspective, etc.) while in the navigation mode 2380. In some embodiments, only some of the described map modification operations are available in the navigation mode. For instance, some embodiments allow the user to zoom in or out, but do not allow any other modifications to the map. Thus, when the user provides gestural input, the gestural input recognition state 2310 filters out types of gestural input not associated with the zoom operation (and subsequently the application returns to state 2380). When the type of gestural input associated with the zoom operation is received, the gestural input recognition state recognizes this input and the application transitions to a state similar to state 2325, for changing the zoom level of the map (with the inertia calculation, in some embodiments).

Other embodiments may enable different map modification operations. For instance, in some embodiments all of the gestural map modification operations (e.g., corollaries to states 2315-2345) are available while in the navigation mode. Some embodiments allow a subset of the gestural map modification operations, such as zooming and a limited panning operation. The panning operation of some embodiments, upon receiving the type of gestural input associated with panning, moves the virtual camera (while in the navigation mode) to the side, then returns the virtual camera back to pointing along the route. Whereas the operations 2315-2345 return to the map browsing state 2305, the corollary operations accessed from the navigation state 2380 return to the navigation state 2380.

When the selected route displayed at state 2375 starts at a location other than the current location of the device (or the route is a walking route) and the user selects a navigation starting control, the application transitions to the stepping mode, or route inspection mode, state 2385. In some embodiments, the application displays the maneuvers performed along the route one at a time (e.g., as navigation signs). By providing gestural input (e.g., swipe gestures) to the maneuvers, the user can view the different maneuvers while in the route inspection mode. The maneuvers are overlaid on a map and at least a portion of the route is displayed in the map.

As in the route display mode, various gestural interactions over the map may cause the application to perform different modifications to the map view (e.g., panning, rotating, zooming, modifying the map perspective, etc.). When the integrated application receives gestural interaction over the map display while in the stepping mode 2385, the application transitions to state 2310 to perform gestural input recognition, with all of the gestural map modification operations (e.g., corollaries to states 2315-2345) available. That is, the application translates the gestural input into panning, rotation, zoom, and/or perspective change operations similar to those described above for states 2315-2345, with similar inertia and rebound features for the virtual camera movement. Whereas the operations 2315-2345 return to the map browsing state 2305, the corollary operations accessed from the stepping mode 2385 return to the stepping mode 2385.

Furthermore, in some embodiments the gestural input recognition recognizes at least one type of gestural input over the displayed maneuvers in order to switch between the maneuvers. When a particular type of gestural input (e.g., a swipe gesture) is received over the displayed maneuver (as opposed to over the map view), the application transitions to a state (not shown) for changing the displayed maneuver, then returns to state 2385.

When the integrated application receives gestural interaction over the map displayed while in the stepping state 2375, the application transitions to state 2310 to perform gestural input recognition, with all of the gestural map modification operations (e.g., corollaries to states 2310-2345) available. When the modification operations are done, the application returns to state 2385. When the user selects a control to end stepping through the maneuvers, the application transitions to state 2305 to present the map browsing view.

In addition, in some embodiments the application can transition from the stepping mode 2385 to an auto-stepping state 2390. When the user selects a location tracking control while the application is in state 2385, the application transitions to an automatic stepping mode 2390, which is a different navigation modality. When in the automatic stepping mode of some embodiments, the integrated mapping, search, and navigation application displays the maneuver to which the device's location is closest (e.g., as measured by a juncture at which the maneuver is performed). When the device moves (e.g., along the route) to a location closer to a different maneuver, the auto-stepping mode automatically displays the different maneuver. When the user deselects the location tracking control, the application transitions back to the stepping mode 2385. When the user selects a control to end navigation while in the auto-stepping state 2390, the application transitions to state 2305 to present the map browsing view.

As in the stepping mode 2385, various gestural interactions over the map may cause the application to perform different modifications to the map view (e.g., panning, rotating, zooming, modifying the map perspective, etc.). When the integrated application receives gestural interaction over the map display while in the auto-stepping mode 2390, the application transitions to state 2310 to perform gestural input recognition, with all of the gestural map modification operations (e.g., corollaries to states 2315-2345) available. That is, the application translates the gestural input into panning, rotation, zoom, and/or perspective change operations similar to those described above for states 2315-2345, with similar inertia and rebound features for the virtual camera movement. Whereas the operations 2315-2345 return to the map browsing state 2305, the corollary operations accessed from the auto-stepping mode 2385 return to the auto-stepping mode 2390. In addition, some embodiments automatically turn the location tracking control off when the user pans the map a particular distance, in which case the application returns to the stepping mode state 2385 rather than auto-stepping state 2390.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 24:
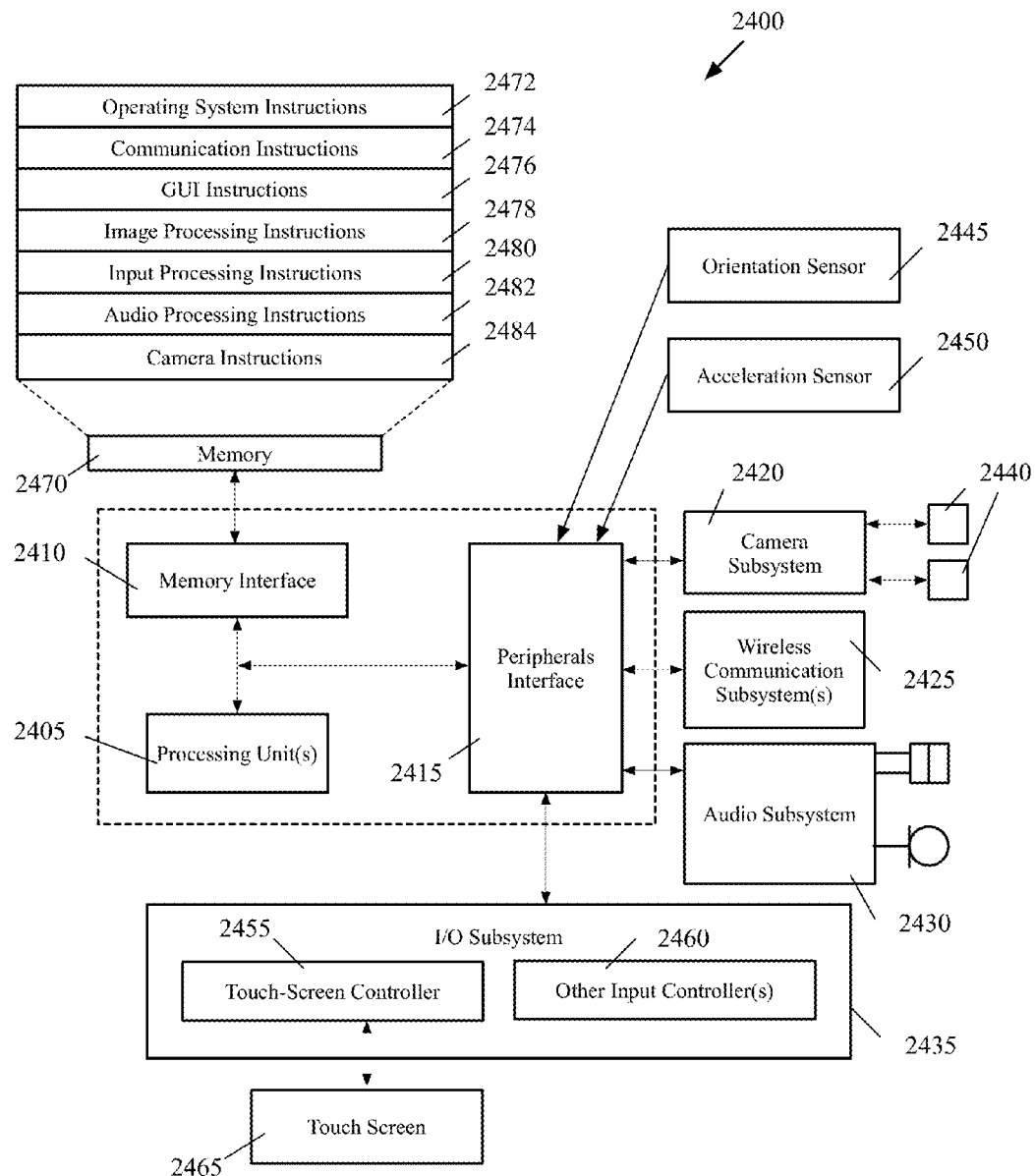
FIG. 24 is an example of an architecture of a mobile computing device.

The mapping and navigation applications of some embodiments operate on mobile devices, such as smart phones (e.g., iPhones®) and tablets (e.g., iPads®). FIG. 24 is an example of an architecture 2400 of such a mobile computing device. Examples of mobile computing devices include smartphones, tablets, laptops, etc. As shown, the mobile computing device 2400 includes one or more processing units 2405, a memory interface 2410 and a peripherals interface 2415.

The peripherals interface 2415 is coupled to various sensors and subsystems, including a camera subsystem 2420, a wireless communication subsystem(s) 2425, an audio subsystem 2430, an I/O subsystem 2435, etc. The peripherals interface 2415 enables communication between the processing units 2405 and various peripherals. For example, an orientation sensor 2445 (e.g., a gyroscope) and an acceleration sensor 2450 (e.g., an accelerometer) is coupled to the peripherals interface 2415 to facilitate orientation and acceleration functions.

The camera subsystem 2420 is coupled to one or more optical sensors 2440 (e.g., a charged coupled device (CCD) optical sensor, a complementary metal-oxide-semiconductor (CMOS) optical sensor, etc.). The camera subsystem 2420 coupled with the optical sensors 2440 facilitates camera functions, such as image and/or video data capturing. The wireless communication subsystem 2425 serves to facilitate communication functions. In some embodiments, the wireless communication subsystem 2425 includes radio frequency receivers and transmitters, and optical receivers and transmitters (not shown in FIG. 24). These receivers and transmitters of some embodiments are implemented to operate over one or more communication networks such as a GSM network, a Wi-Fi network, a Bluetooth network, etc. The audio subsystem 2430 is coupled to a speaker to output audio (e.g., to output voice navigation instructions). Additionally, the audio subsystem 2430 is coupled to a microphone to facilitate voice-enabled functions, such as voice recognition (e.g., for searching), digital recording, etc.

The I/O subsystem 2435 involves the transfer between input/output peripheral devices, such as a display, a touch screen, etc., and the data bus of the processing units 2405 through the peripherals interface 2415. The I/O subsystem 2435 includes a touch-screen controller 2455 and other input controllers 2460 to facilitate the transfer between input/output peripheral devices and the data bus of the processing units 2405. As shown, the touch-screen controller 2455 is coupled to a touch screen 2465. The touch-screen controller 2455 detects contact and movement on the touch screen 2465 using any of multiple touch sensitivity technologies. The other input controllers 2460 are coupled to other input/control devices, such as one or more buttons. Some embodiments include a near-touch sensitive screen and a corresponding controller that can detect near-touch interactions instead of or in addition to touch interactions.

The memory interface 2410 is coupled to memory 2470. In some embodiments, the memory 2470 includes volatile memory (e.g., high-speed random access memory), non-volatile memory (e.g., flash memory), a combination of volatile and non-volatile memory, and/or any other type of memory. As illustrated in FIG. 24, the memory 2470 stores an operating system (OS) 2472. The OS 2472 includes instructions for handling basic system services and for performing hardware dependent tasks.

The memory 2470 also includes communication instructions 2474 to facilitate communicating with one or more additional devices; graphical user interface instructions 2476 to facilitate graphic user interface processing; image processing instructions 2478 to facilitate image-related processing and functions; input processing instructions 2480 to facilitate input-related (e.g., touch input) processes and functions; audio processing instructions 2482 to facilitate audio-related processes and functions; and camera instructions 2484 to facilitate camera-related processes and functions. The instructions described above are merely exemplary and the memory 2470 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 24 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 24 may be split into two or more integrated circuits.

B. Computer System

Figure 25:
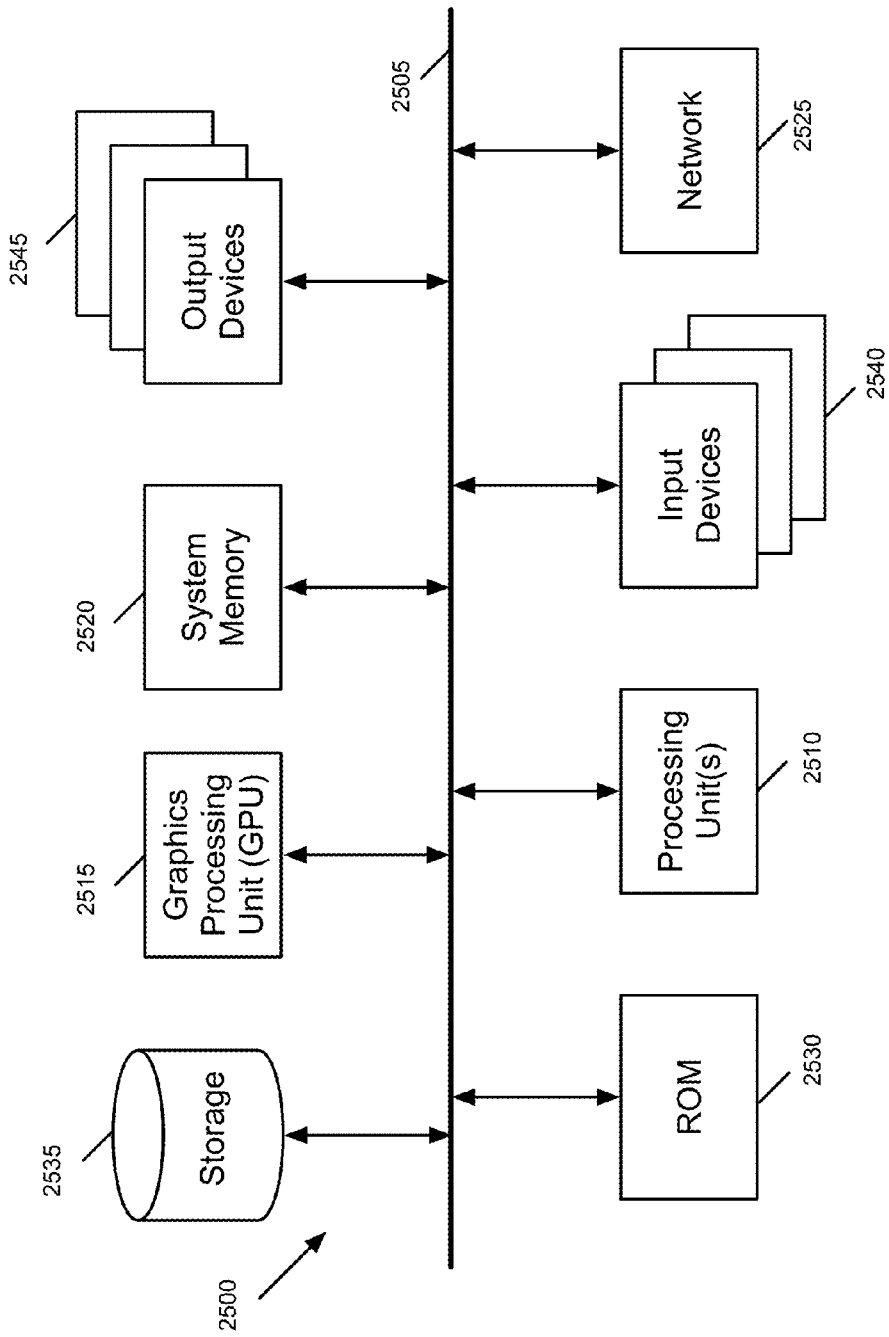
FIG. 25 conceptually illustrates an example of an electronic system.

FIG. 25 conceptually illustrates another example of an electronic system 2500 with which some embodiments of the invention are implemented. The electronic system 2500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2500 includes a bus 2505, processing unit(s) 2510, a graphics processing unit (GPU) 2515, a system memory 2520, a network 2525, a read-only memory 2530, a permanent storage device 2535, input devices 2540, and output devices 2545.

The bus 2505 collectively represents all system, peripheral, and chipset buses that communicatively connect the numerous internal devices of the electronic system 2500. For instance, the bus 2505 communicatively connects the processing unit(s) 2510 with the read-only memory 2530, the GPU 2515, the system memory 2520, and the permanent storage device 2535.

From these various memory units, the processing unit(s) 2510 retrieves instructions to execute and data to process in order to execute the processes of the invention. The processing unit(s) may be a single processor or a multi-core processor in different embodiments. Some instructions are passed to and executed by the GPU 2515. The GPU 2515 can offload various computations or complement the image processing provided by the processing unit(s) 2510. In some embodiments, such functionality can be provided using CoreImage's kernel shading language.

The read-only-memory (ROM) 2530 stores static data and instructions that are needed by the processing unit(s) 2510 and other modules of the electronic system. The permanent storage device 2535, on the other hand, is a read-and-write memory device. This device is a non-volatile memory unit that stores instructions and data even when the electronic system 2500 is off. Some embodiments of the invention use a mass-storage device (such as a magnetic or optical disk and its corresponding disk drive, integrated flash memory) as the permanent storage device 2535.

Other embodiments use a removable storage device (such as a floppy disk, flash memory device, etc., and its corresponding drive) as the permanent storage device. Like the permanent storage device 2535, the system memory 2520 is a read-and-write memory device. However, unlike storage device 2535, the system memory 2520 is a volatile read-and-write memory, such a random access memory. The system memory 2520 stores some of the instructions and data that the processor needs at runtime. In some embodiments, the invention's processes are stored in the system memory 2520, the permanent storage device 2535, and/or the read-only memory 2530. From these various memory units, the processing unit(s) 2510 retrieves instructions to execute and data to process in order to execute the processes of some embodiments.

The bus 2505 also connects to the input and output devices 2540 and 2545. The input devices 2540 enable the user to communicate information and select commands to the electronic system. The input devices 2540 include alphanumeric keyboards and pointing devices (also called "cursor control devices"), cameras (e.g., webcams), microphones or similar devices for receiving voice commands, etc. The output devices 2545 display images generated by the electronic system or otherwise output data. The output devices 2545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 25, bus 2505 also couples electronic system 2500 to a network 2525 through a network adapter (not shown). In this manner, the computer can be a part of a network of computers (such as a local area network ("LAN"), a wide area network ("WAN"), or an Intranet, or a network of networks, such as the Internet. Any or all components of electronic system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

IV. Map Service Environment

Figure 26:
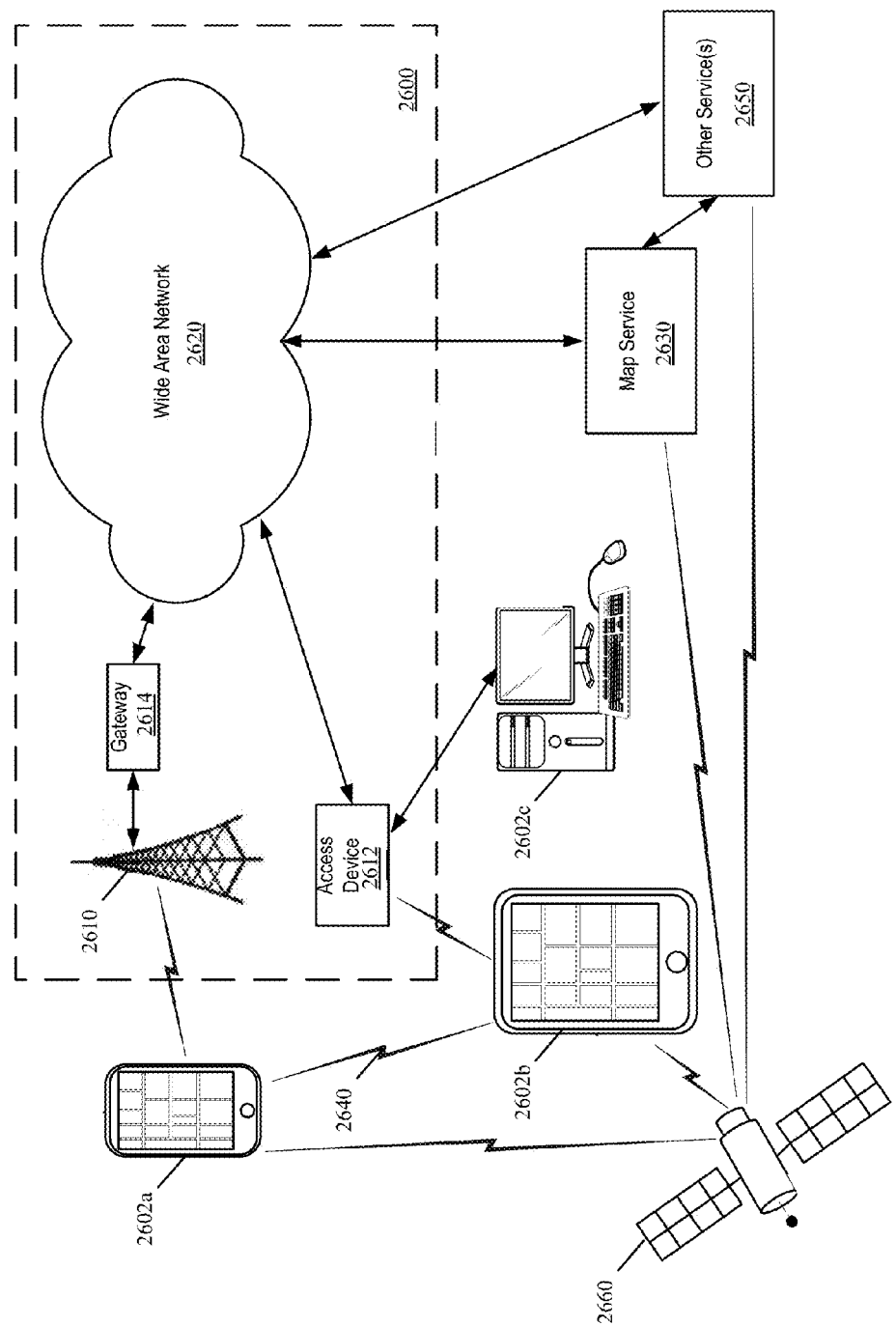
FIG. 26 illustrates a map service operating environment.

Various embodiments may operate within a map service operating environment. FIG. 26 illustrates a map service operating environment, according to some embodiments. A map service 2630 (also referred to as mapping service) may provide map services for one or more client devices 2602a-2602c in communication with the map service 2630 through various communication methods and protocols. A map service 2630 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 2602a-2602c may utilize these map services by obtaining map service data. Client devices 2602a-2602c may implement various techniques to process map service data. Client devices 2602a-2602c may then provide map services to various entities, including, but not limited to, users, internal software or hardware modules, and/or other systems or devices external to the client devices 2602a-2602c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wired or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 2602a-2602c) are implemented on different portable-multifunction device types. Client devices 2602a-2602c utilize map service 2630 through various communication methods and protocols. In some embodiments, client devices 2602a-2602c obtain map service data from map service 2630. Client devices 2602a-2602c request or receive map service data. Client devices 2602a-2602c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS) system. A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow the virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wired or wireless network type).

FIG. 26 illustrates one possible embodiment of an operating environment 2600 for a map service 2630 and client devices 2602a-2602c. In some embodiments, devices 2602a, 2602b, and 2602c communicate over one or more wired or wireless networks 2610. For example, wireless network 2610, such as a cellular network, can communicate with a wide area network (WAN) 2620, such as the Internet, by use of gateway 2614. A gateway 2614 in some embodiments provides a packet oriented mobile data service, such as General Packet Radio Service (GPRS), or other mobile data service allowing wireless networks to transmit data to other networks, such as wide area network 2620. Likewise, access device 2612 (e.g., IEEE 802.11g wireless access device) provides communication access to WAN 2620. Devices 2602a and 2602b can be any portable electronic or computing device capable of communicating with a map service. Device 2602c can be any non-portable electronic or computing device capable of communicating with a map service.

In some embodiments, both voice and data communications are established over wireless network 2610 and access device 2612. For instance, device 2602a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 2610, gateway 2614, and WAN 2620 (e.g., using Transmission Control Protocol/Internet Protocol (TCP/IP) or User Datagram Protocol (UDP)). Likewise, in some implementations, devices 2602b and 2602c can place and receive phone calls, send and receive e-mail messages, and retrieve electronic documents over access device 2612 and WAN 2620. In various embodiments, any of the illustrated client devices may communicate with map service 2630 and/or other service(s) 2650 using a persistent connection established in accordance with one or more security protocols, such as the Secure Sockets Layer (SSL) protocol or the Transport Layer Security (TLS) protocol.

Devices 2602a and 2602b can also establish communications by other means. For example, wireless device 2602a can communicate with other wireless devices (e.g., other devices 2602b, cell phones, etc.) over the wireless network 2610. Likewise devices 2602a and 2602b can establish peer-to-peer communications 2640 (e.g., a personal area network) by use of one or more communication subsystems, such as Bluetooth® communication from Bluetooth Special Interest Group, Inc. of Kirkland, Wash. Device 2602c can also establish peer to peer communications with devices 2602a or 2602b (not shown). Other communication protocols and topologies can also be implemented. Devices 2602a and 2602b may also receive Global Positioning Satellite (GPS) signals from GPS satellites 2660.

Devices 2602a, 2602b, and 2602c can communicate with map service 2630 over one or more wire and/or wireless networks, 2610 or 2612. For instance, map service 2630 can provide map service data to rendering devices 2602a, 2602b, and 2602c. Map service 2630 may also communicate with other services 2650 to obtain data to implement map services. Map service 2630 and other services 2650 may also receive GPS signals from GPS satellites 2660.

In various embodiments, map service 2630 and/or other service(s) 2650 are configured to process search requests from any of the client devices. Search requests may include but are not limited to queries for businesses, addresses, residential locations, points of interest, or some combination thereof. Map service 2630 and/or other service(s) 2650 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2630 and/or other service(s) 2650 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2630 and/or other service(s) 2650, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2630 and/or other service(s) 2650 provide one or more feedback mechanisms to receive feedback from client devices 2602a-2602c. For instance, client devices may provide feedback on search results to map service 2630 and/or other service(s) 2650 (e.g., feedback specifying ratings, reviews, temporary or permanent business closures, errors etc.); this feedback may be used to update information about points of interest in order to provide more accurate or more up-to-date search results in the future. In some embodiments, map service 2630 and/or other service(s) 2650 may provide testing information to the client device (e.g., an A/B test) to determine which search results are best. For instance, at random intervals, the client device may receive and present two search results to a user and allow the user to indicate the best result. The client device may report the test results to map service 2630 and/or other service(s) 2650 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A non-transitory machine readable medium storing a program which when executed by at least one processing unit of a device displays a map, the program comprising sets of instructions for:
    displaying a calculated route on the displayed map, the calculated route comprising a plurality of maneuver instructions for a plurality of junctures along the calculated route;
    tracking a first location of the device;
    identifying a first juncture along the calculated route based on the first tracked location of the device;
    displaying on the displayed map (i) a first user interface (UI) item for providing a first maneuver instruction for the first juncture and (ii) a juncture indicator for indicating the first juncture on the map;
    when a second tracked location meets a first set of criteria, replacing the first UI item with a second UI item for providing a second maneuver instruction for a second juncture of the route; and
    when a third different tracked location meets a second different set of criteria, moving the juncture indicator from the first juncture to the second juncture to identify the second juncture of the route on the map.

2. The machine readable medium of claim 1, wherein the program further comprises sets of instructions for:
    receiving a starting location and a destination location; and
    calculating a set of routes between the starting location and the destination location.

3. The machine readable medium of claim 2, wherein the set of instructions for calculating the set of routes comprises sets of instructions for:
    identifying, for each route, a plurality of junctures in the route, each juncture having a corresponding maneuver instruction to display; and
    generating a plurality of UI items for providing the maneuver instructions.

4. The machine readable medium of claim 1, wherein the set of instructions for identifying the first juncture comprises a set of instructions for identifying a juncture along the calculated route that has a maneuver instruction and is closest to the first tracked location of the device.

5. The machine readable medium of claim 1, wherein the set of instructions for replacing the first UI item comprises a set of instructions for sliding out the first UI item and sliding in the second UI item based on the second tracked location of the device.

6. The machine readable medium of claim 1, wherein the set of instructions for displaying the first UI item comprises sets of instructions for:
    identifying a level of accuracy of a tracked location of the device; and
    using the identified accuracy level to identify a UI item to display in the display area.

7. A mobile device comprising:
    a set of processing units;
    a display area; and
    a non-transitory machine readable medium storing a program, which when executed by at least one of the processing units, displays a map on the display area, the program comprising sets of instructions for:
    displaying a calculated route on the displayed map, the calculated route comprising a plurality of maneuver instructions for a plurality of junctures along the calculated route;
    tracking a first location of the device;
    identifying a first juncture along the calculated route based on the first tracked location of the device;
    displaying on the displayed map (i) a first user interface (UI) item for providing a first maneuver instruction for the first juncture and (ii) a juncture indicator for indicating the first juncture on the map;
    when a second tracked location meets a first set of criteria, replacing the first UI item with a second UI item for providing a second maneuver instruction for a second juncture of the route;
    and when a third different tracked location meets a second different set of criteria, moving the juncture indicator from the first juncture to the second juncture to identify the second juncture of the route on the map.

8. The mobile device of claim 7, wherein the program further comprises sets of instructions for:
    receiving a starting location and a destination location; and
    calculating a set of routes between the starting location and the destination location.

9. The mobile device of claim 8, wherein the set of instructions for calculating the set of routes comprises sets of instructions for:
    identifying, for each route, a plurality of junctures in the route, each juncture having a corresponding maneuver instruction to display; and
    generating a plurality of UI items for providing the maneuver instructions.

10. The mobile device of claim 7, wherein the set of instructions for identifying the first juncture comprises a set of instructions for identifying a juncture along the calculated route that has a maneuver instruction and is closest to the first tracked location of the device.

11. The mobile device of claim 7, wherein the set of instructions for replacing the first UI item comprises a set of instructions for sliding out the first UI item and sliding in the second UI item based on the second tracked location of the device.

12. The mobile device of claim 7, wherein the set of instructions for displaying the first UI item comprises sets of instructions for:
   identifying a level of accuracy of a tracked location of the device; and
   using the identified accuracy level to identify a UI item to display in the display area.

13. A method for displaying a map, the method comprising:
   displaying a calculated route on the displayed map, the calculated route comprising a plurality of maneuver instructions for a plurality of junctures along the calculated route;
   tracking a first location of the device;
   identifying a first juncture along the calculated route based on the first tracked location of the device;
   displaying on the displayed map (i) a first user interface (UI) item for providing a first maneuver instruction for the first juncture and (ii) a juncture indicator for indicating the first juncture on the map;
   when a second tracked location meets a first set of criteria, replacing the first UI item with a second UI item for providing a second maneuver instruction for a second juncture of the route; and
   when a third different tracked location meets a second different set of criteria, moving the juncture indicator from the first juncture to the second juncture to identify the second juncture of the route on the map.

14. The method of claim 13 further comprising:
   receiving a starting location and a destination location; and
   calculating a set of routes between the starting location and the destination location.

15. The method of claim 14, wherein calculating the set of routes comprises:
   identifying, for each route, a plurality of junctures in the route, each juncture having a corresponding maneuver instruction to display; and
   generating a plurality of UI items for providing the maneuver instructions.

16. The method of claim 13, wherein identifying the first juncture comprises identifying a juncture along the calculated route that has a maneuver instruction and is closest to the first tracked location of the device.

17. The method of claim 13, wherein replacing the first UI item comprises sliding out the first UI item and sliding in the second UI item based on the second tracked location of the device.

18. The method of claim 13, wherein displaying the first UI item comprises:
   identifying a level of accuracy of a tracked location of the device; and
   using the identified accuracy level to identify a UI item to display in the display area.

* * * * *